US012451084B2

(12) United States Patent
Lee et al.

(10) Patent No.: US 12,451,084 B2
(45) Date of Patent: Oct. 21, 2025

(54) DISPLAY DRIVING CIRCUIT AND DISPLAY DEVICE INCLUDING THE SAME

(71) Applicant: SAMSUNG ELECTRONICS CO., LTD., Suwon-si (KR)

(72) Inventors: Heejin Lee, Suwon-si (KR); Minsung Kim, Suwon-si (KR); Sunkwon Kim, Suwon-si (KR); Seongyoung Ryu, Suwon-si (KR); Uijong Song, Suwon-si (KR); Yilho Lee, Suwon-si (KR); Yunrae Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/741,906

(22) Filed: Jun. 13, 2024

(65) Prior Publication Data

US 2025/0006137 A1 Jan. 2, 2025

(30) Foreign Application Priority Data

Jun. 28, 2023 (KR) ........................ 10-2023-0083771

(51) Int. Cl.

| | |
|---|---|
| ***G09G 3/32*** | (2016.01) |
| ***G09G 3/00*** | (2006.01) |
| ***G09G 3/3275*** | (2016.01) |

(52) U.S. Cl.

CPC ........... *G09G 3/3275* (2013.01); *G09G 3/006* (2013.01); *G09G 2300/0838* (2013.01); *G09G 2310/08* (2013.01); *G09G 2330/12* (2013.01)

(58) Field of Classification Search

CPC ......... G09G 3/3275; G09G 2300/0838; G09G 2310/08; G09G 2330/12

See application file for complete search history.

(56) References Cited

U.S. PATENT DOCUMENTS

| | | | |
|---|---|---|---|
| 6,372,608 | B1 | 4/2002 | Shimoda et al. |
| 6,645,830 | B2 | 11/2003 | Shimoda et al. |
| RE38,466 | E | 3/2004 | Inoue et al. |
| 6,818,465 | B2 | 11/2004 | Biwa et al. |
| 6,818,530 | B2 | 11/2004 | Shimoda et al. |
| 6,858,081 | B2 | 2/2005 | Biwa et al. |
| 6,967,353 | B2 | 11/2005 | Suzuki et al. |
| 7,002,182 | B2 | 2/2006 | Okuyama et al. |

(Continued)

FOREIGN PATENT DOCUMENTS

| | | |
|---|---|---|
| KR | 10-0812058 B1 | 3/2008 |

*Primary Examiner* — Michael A Faragalla

(74) *Attorney, Agent, or Firm* — Sughrue Mion, PLLC

(57) ABSTRACT

A display driving circuit includes a control logic, a source amplifier, and first and second switching elements. The source amplifier includes a first input terminal, a second input terminal, and an output terminal, and amplifies a pixel voltage for displaying an image on a display panel and provides the amplified pixel voltage to a pixel through a data line. The first switching element is connected between the first input terminal and the output terminal, and the second switching element is connected between the first input terminal and the sensing line. The control logic controls the first switching element and the second switching element such that the source amplifier compares a sample voltage that is input to the first input terminal through a sensing line with a comparison voltage input to the second input terminal and outputs comparison data based on the comparison.

20 Claims, 24 Drawing Sheets

(56) References Cited

U.S. PATENT DOCUMENTS

| | | | |
|---|---|---|---|
| 7,084,420 | B2 | 8/2006 | Kim et al. |
| 7,087,932 | B2 | 8/2006 | Okuyama et al. |
| 7,154,124 | B2 | 12/2006 | Han et al. |
| 7,208,725 | B2 | 4/2007 | Sherrer et al. |
| 7,288,758 | B2 | 10/2007 | Sherrer et al. |
| 7,319,044 | B2 | 1/2008 | Han et al. |
| 7,501,656 | B2 | 3/2009 | Han et al. |
| 7,709,857 | B2 | 5/2010 | Kim et al. |
| 7,759,140 | B2 | 7/2010 | Lee et al. |
| 7,781,727 | B2 | 8/2010 | Sherrer et al. |
| 7,790,482 | B2 | 9/2010 | Han et al. |
| 7,940,350 | B2 | 5/2011 | Jeong |
| 7,959,312 | B2 | 6/2011 | Yoo et al. |
| 7,964,881 | B2 | 6/2011 | Choi et al. |
| 7,985,976 | B2 | 7/2011 | Choi et al. |
| 7,994,525 | B2 | 8/2011 | Lee et al. |
| 8,008,683 | B2 | 8/2011 | Choi et al. |
| 8,013,352 | B2 | 9/2011 | Lee et al. |
| 8,049,161 | B2 | 11/2011 | Sherrer et al. |
| 8,129,711 | B2 | 3/2012 | Kang et al. |
| 8,179,938 | B2 | 5/2012 | Kim |
| 8,263,987 | B2 | 9/2012 | Choi et al. |
| 8,274,503 | B2 | 9/2012 | Kwon |
| 8,324,646 | B2 | 12/2012 | Lee et al. |
| 8,399,944 | B2 | 3/2013 | Kwak et al. |
| 8,432,511 | B2 | 4/2013 | Jeong |
| 8,459,832 | B2 | 6/2013 | Kim |
| 8,502,242 | B2 | 8/2013 | Kim |
| 8,536,604 | B2 | 9/2013 | Kwak et al. |
| 8,735,931 | B2 | 5/2014 | Han et al. |
| 8,766,295 | B2 | 7/2014 | Kim |
| 9,449,559 | B2 | 9/2016 | In et al. |
| 10,062,326 | B2 | 8/2018 | Takizawa et al. |
| 10,424,254 | B2 | 9/2019 | An et al. |
| 11,244,632 | B2 | 2/2022 | Eom et al. |
| 11,308,892 | B2 | 4/2022 | Cho et al. |
| 2020/0020278 | A1* | 1/2020 | Lee ...................... G09G 3/3275 |
| 2021/0287607 | A1* | 9/2021 | Hikichi ................ G09G 3/3266 |
| 2022/0200538 | A1* | 6/2022 | Chu ..................... G11C 29/028 |
| 2022/0319375 | A1* | 10/2022 | Ichikura ................... G09G 3/20 |

* cited by examiner

10

DISPLAY DRIVING CIRCUIT AND DISPLAY DEVICE INCLUDING THE SAME

CROSS-REFERENCE TO RELATED APPLICATION

This application is based on and claims priority under 35 U.S.C. § 119 to Korean Patent Application No. 10-2023-0083771, filed on Jun. 28, 2023, in the Korean Intellectual Property Office, the disclosure of which being incorporated by reference herein in its entirety.

BACKGROUND

Embodiments consistent with the present disclosure relate to a semiconductor device, and more particularly, to a display driving circuit and a display device. More particularly, embodiments consistent with the present disclosure relate to a display driving circuit and a display device for determining whether an error has occurred in a pixel, by using a source amplifier.

Recently, the use of an organic light emitting diode (OLED) display panel in which each of a plurality of pixels of a pixel array includes an OLED has increased. As the resolution of the display device has increased, the number of pixels thereof has increased and each of the pixels may include a plurality of elements. In order for the display device to normally display an image, a test operation for identifying whether an error has occurred in the pixel is required. It may take a lot of time and cost to perform a test operation on a large number of pixels.

Accordingly, technology for reducing the time and cost taken to perform the test operation is required.

SUMMARY

It is an aspect to provide a display driving circuit and a display device in which a source amplifier for amplifying a pixel voltage to display an image on a display panel operates as a comparator to compare a sample voltage with a comparison voltage, thereby reducing the cost and time taken to identify whether an error has occurred in a pixel.

According to an aspect of one or more embodiments, there is provided a display driving circuit for driving a display panel including a data line, a sensing line, and a pixel connected to the data line and the sensing line, the display driving circuit comprising a control logic controlling an operation of the display driving circuit; a source amplifier comprising a first input terminal, a second input terminal, and an output terminal, the source amplifier amplifying a pixel voltage for displaying an image on the display panel and providing the amplified pixel voltage to the pixel through the data line; a first switching element connected between the first input terminal and the output terminal; and a second switching element connected between the first input terminal and the sensing line, wherein the control logic controls the first switching element and the second switching element such that the source amplifier compares a sample voltage that is input to the first input terminal through the sensing line with a comparison voltage input to the second input terminal and outputs comparison data based on the comparison.

According to another aspect of one or more embodiments, there is provided a display driving circuit for driving a display panel including a plurality of data lines, a plurality of sensing lines, and a plurality of pixels connected to the plurality of data lines and the plurality of sensing lines, the display driving circuit comprising a plurality of decoders that correspond respectively to the plurality of data lines, each decoder converting pixel data of a corresponding data line and outputting a pixel voltage; a plurality of source amplifiers that correspond respectively to the plurality of decoders, each source amplifier comprising a first input terminal, a second input terminal and an output terminal, and amplifying a corresponding pixel voltage and providing the amplified pixel voltage to a corresponding pixel through the corresponding data line; a plurality of first switching elements that correspond respectively to the plurality of source amplifiers, each first switching element connected between the first input terminal and the output terminal of a corresponding source amplifier; and a plurality of second switching elements that corresponding respectively to the plurality of source amplifiers, each second switching element connected between the first input terminal of the corresponding source amplifier and a corresponding sensing line. Each of the plurality of source amplifiers, in a first operation mode, amplifies the corresponding pixel voltage to be output to the corresponding data line, and, in a second operation mode, based on an operation of the first switching element and the second switching element, compares a sample voltage input to the first input terminal through corresponding sensing line with a comparison voltage input to the second input terminal and outputs comparison data.

According to yet another aspect of one or more embodiments, there is provided a display device comprising a display panel comprising a data line, a sensing line, and a pixel connected to the data line and the sensing line; and a display driving circuit that drives the display panel such that an image is displayed on the display panel. The display driving circuit comprises a source amplifier comprising a first input terminal, a second input terminal, and an output terminal, the source amplifier amplifying a pixel voltage for displaying the image on the display panel and providing the amplified pixel voltage to the pixel through the data line; a first switching element connected between the first input terminal and the output terminal of the source amplifier; and a second switching element connected between the first input terminal of the source amplifier and the sensing line. The source amplifier, based on an operation of the first switching element and the second switching element, compares a sample voltage input to the first input terminal of the source amplifier through the sensing line with a comparison voltage input to the second input terminal of the source amplifier and outputs comparison data.

BRIEF DESCRIPTION OF THE DRAWINGS

Various embodiments will be more clearly understood from the following detailed description taken in conjunction with the accompanying drawings, in which.

DETAILED DESCRIPTION

Figure 1:
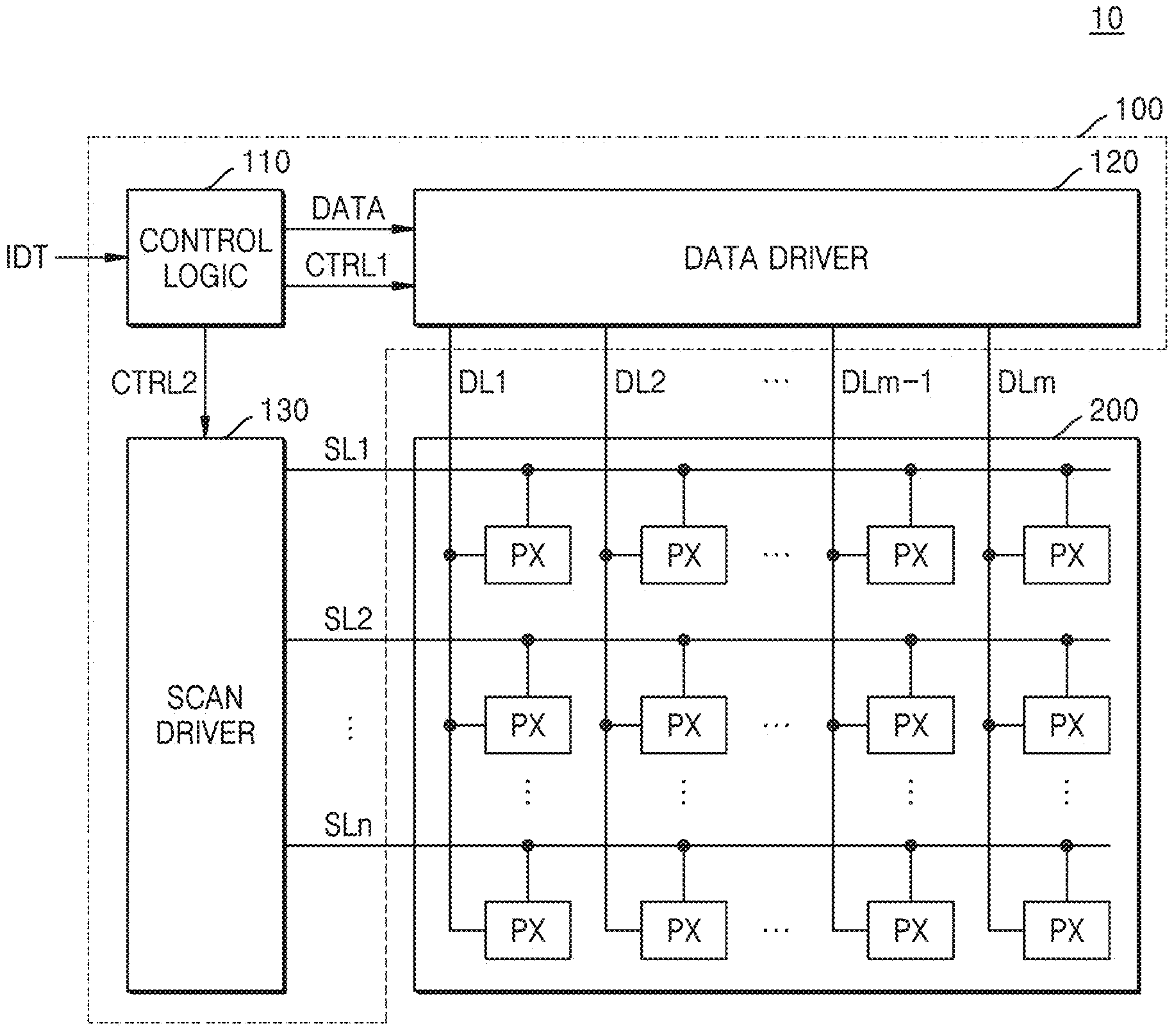
FIG. 1 is a block diagram illustrating a display device according to an embodiment.

A display device may include a display panel that displays an image and a display driving circuit that drives the display panel. The display driving circuit may drive the display panel by receiving image data from the outside and applying an image signal corresponding to the received image data to a data line of the display panel. As described above, recently, the use of an organic light emitting diode (OLED) display panel in which each of a plurality of pixels of a pixel array includes an OLED has increased.

A display device may include a plurality of pixels. The plurality of pixels may be arranged in rows and columns. The rows of the plurality of pixels may be connected to a scan driver, and the columns of the plurality of pixels may be connected to a data driver. The scan driver may control the timing of selecting each of the rows of the plurality of pixels. The data driver may adjust the brightness of the pixels in the selected row.

As describe above, as the resolution of the display device has increased, the number of pixels thereof has increased and each of the pixels may include a plurality of elements. In order for the display device to normally display the image, a test operation for identifying whether an error has occurred in the pixel is required. It may take a lot of time and cost to perform a test operation on a large number of pixels.

Various embodiments provide a display driving circuit and a display device in which a source amplifier for amplifying a pixel voltage to display an image on a display panel operates as a comparator to compare a sample voltage with a comparison voltage, thereby reducing the cost and time taken to identify whether an error has occurred in a pixel.

Hereinafter, various embodiments will be described in detail so that those of ordinary skill in the art may easily implement the embodiments. Hereinafter, the various embodiments will be described in detail with reference to the accompanying drawings. In the following description and the drawings, like reference numerals will denote like elements, and redundant descriptions thereof will be omitted for conciseness.

FIG. 1 is a block diagram illustrating a display device according to an embodiment.

Referring to FIG. 1, a display device 10 may include a display driving circuit 100 (also referred to as a display driving integrated circuit) and a display panel 200.

In an embodiment, the display device 10 may be mounted on an electronic device having an image display function. For example, the electronic device may include smartphones, tablet personal computers, portable multimedia players (PMPs), cameras, wearable devices, televisions, digital video disk (DVD) players, refrigerators, air conditioners, air cleaners, set-top boxes, robots, drones, various medical devices, navigation devices, augmented reality (AR) devices, virtual reality (VR) devices, global positioning system (GPS) receivers, advanced driver assistance systems (ADASs), vehicle devices, furniture, or various measurement devices.

In an embodiment, the electronic device may include AR glasses in the shape of glasses worn on the user's face or a head mounted display (HMD) device, a VR headset (VRH), or an AR helmet worn on the user's head.

The display device 10 may display image data IDT received from a host (not illustrated). In an embodiment, the display device 10 may be a device in which the display driving circuit 100 and the display panel 200 are implemented as one module. For example, the display driving circuit 100 may be mounted on a substrate of the display panel 200, or the display driving circuit 100 and the display panel 200 may be electrically connected through a connection member such as a flexible printed circuit board (FPCB).

The display panel 200 may be a display that actually displays an image and may be one of display devices such as an organic light emitting diode (OLED) display, a thin film transistor-liquid crystal display (TFT-LCD), a field emission display, and a plasma display panel (PDP) display that receive an electrically transmitted image signal and display a two-dimensional image. Hereinafter, it is assumed that the display panel 200 is an OLED display panel in which each of the pixels includes an OLED. However, embodiments are not limited thereto, and in some embodiments, the display panel 200 may be implemented as other types of flat panel displays or flexible display panels. In an embodiment, the display device 10 may include an OLED-on-silicon (OLEDoS).

The display driving circuit 100 may receive the image data IDT from the host. The display driving circuit 100 may convert the image data IDT into a plurality of analog signals, for example, a plurality of data voltages, for driving the display panel 200. The display driving circuit 100 may supply the plurality of analog signals to the display panel 200. Accordingly, an image corresponding to the image data IDT may be displayed on the display panel 200.

The display driving circuit 100 may include a control logic 110, a data driver 120 (also referred to as a source driver), and a scan driver 130 (also referred to as a gate driver). The display driving circuit 100 may further include other components such as an interface circuit, a memory, a voltage generator, and a clock generator, etc.

In an embodiment, the control logic 110, the data driver 120, and the scan driver 130 may be integrated into one semiconductor chip. However, embodiments are not limited thereto, and in some embodiments, the control logic 110 and the data driver 120 may be formed in one semiconductor chip and the scan driver 130 may be formed in the display panel 200.

The control logic 110 may control the overall operation of the display driving circuit 100. For example, the control logic 110 may control the components of the display driving circuit 100 such as the data driver 120 and the scan driver 130 such that the image data IDT received from an external device or the host is displayed on the display panel 200.

The control logic 110 may perform image processing for luminance change, size change, format change, and/or the like on the received image data IDT or may generate, based on the received image data IDT, new image data to be displayed on the display panel 200 and transmit pixel data DATA to the data driver 120. In this case, the control logic 110 may include image processors (IPs) for image processing.

The control logic 110 may provide a data driver control signal to the data driver 120. The control logic 110 may control the data driver 120 through a data driver control signal. The data driver control signal may be a first control signal CTRL1 for controlling the data driver 120. The control logic 110 may output the first control signal CTRL1 to the data driver 120.

The control logic 110 may provide a scan driver control signal to the scan driver 130. The control logic 110 may control the scan driver 130 through a scan driver control signal. Alternatively, the control logic 110 may control the operation timings of the scan driver 130 through a timing signal. The scan driver control signal may be a second control signal CTRL2 for controlling the scan driver 130. The control logic 110 may output the second control signal CTRL2 to the scan driver 130.

The data driver 120 may be connected to the columns of pixels PX through a plurality of data lines DL1 to DLm. The data driver 120 may receive the pixel data DATA from the control logic 110. The pixel data DATA may include information about the brightness (or luminance) of pixels of one row. The data driver 120 may convert the received pixel data DATA into a plurality of image signals, for example, a plurality of data voltages. The data driver 120 may output a plurality of data voltages to the display panel 200 through a plurality of data lines DL.

The data driver 120 may receive the pixel data DATA in units of line data, that is, in units of data corresponding to a plurality of pixels included in one horizontal line of the display panel 200. The data driver 120 may convert line data received from the control logic 110 into a plurality of data voltages. The data driver 120 may provide a plurality of data voltages corresponding to the luminance to the display panel 200 through a plurality of data lines DL.

The scan driver 130 may be connected to a plurality of scan lines SL1 to SLn of the display panel 200 and may sequentially drive the plurality of scan lines SL1 to SLn of the display panel 200. Under control by the control logic 110, the scan driver 130 may sequentially provide a plurality of scan-on signals having an active level, for example, a logic high level, to the plurality of scan lines SL1 to SLn. Thus, the plurality of scan lines SL1 to SLn may be sequentially selected, and the plurality of data voltages may be applied to the pixels PX of the horizontal line corresponding to the selected scan line through the data lines DL1 to DLm.

In an embodiment, the display driving circuit 100 may obtain a sample voltage from the pixels PX of the display panel 200. For example, in a test mode, the display driving circuit 100 may read a pixel voltage provided from the display panel 200, as a sample voltage. The display panel 200 may further include a sensing line. Particularly, the data driver 120 may be connected to each of the pixels PX through each of the data lines DL1 to DLm and the sensing line. The data driver 120 may provide the pixel data DATA to the display panel 200 through the data lines DL1 to DLm and receive the sample voltage from the display panel 200 through the sensing line.

The display driving circuit 100 may receive the sample voltage and generate, based on the sample voltage, comparison data for determining whether an error has occurred in each of the pixels PX. A method by which the display driving circuit 100 generates the comparison data will be described below in detail with reference to FIG. 2.

In some embodiments, the display panel 200 may include the plurality of scan lines SL1 to SLn, the plurality of data lines DL1 to DLm arranged in a direction intersecting with the plurality of scan lines SL1 to SLn, and the plurality of pixels PX arranged in an area where the scan lines and the data lines intersect with each other. For example, the display panel 200 may further include a plurality of sensing lines arranged in the same direction as the plurality of data lines DL1 to DLm. Each of the plurality of pixels PX may be connected to the scan line SL, the data line DL, and the sensing line corresponding thereto.

The display panel 200 may include a plurality of horizontal lines (or rows), and one horizontal line may include pixels PX connected to one scan line. For example, the pixels PX of a first row connected to a first scan line SL1 may form a first horizontal line, and the pixels PX of a second row connected to a second scan line SL2 may form a second horizontal line.

The pixels PX of one horizontal line may be driven during the horizontal line time, and the pixels PX of another horizontal line may be driven during the next horizontal line time. For example, the pixels PX of the first horizontal line corresponding to the first scan line SL1 may be driven during the first horizontal line time, and then the pixels PX of the second horizontal line corresponding to the second scan line SL2 may be driven during the second horizontal line time. As such, the pixels PX of the display panel 200 may be driven during the first to n-th horizontal line times.

In an embodiment, the display panel 200 may be connected to the data driver 120 through the data lines DL1 to DLm and the sensing line. The display panel 200 may provide a sample voltage to the data driver 120 through the sensing line connected to each of the pixels PX.

Each of the pixels PX may adjust the brightness thereof in response to each of control signals corresponding thereto. For example, each of the pixels PX may be selected in response to a corresponding scan signal among a plurality of scan signals S1 to Sn. Each of the selected pixels PX may emit light based on the corresponding pixel data among the pixel data DATA. Each of the pixels PX may include a light emitting element such as an OLED and transistors for controlling the light emitting element.

Each of the plurality of pixels PX may output light of a preset color, and two or more pixels PX (e.g., red, blue, and green pixels) arranged adjacent to each other on the same line or on adjacent lines and outputting light of different colors may constitute one unit pixel. In this case, two or more pixels PX constituting a unit pixel may be referred to as subpixels. The display panel 200 may have an RGB structure in which red, blue, and green pixels constitute one unit pixel. However, embodiments are not limited thereto, and the display panel 200 may have an RGBW structure in which the unit pixel further includes a white pixel for luminance improvement. Alternatively, the unit pixel of the display panel 200 may include a combination of pixels of other colors other than red, green, and blue colors.

Figure 2:
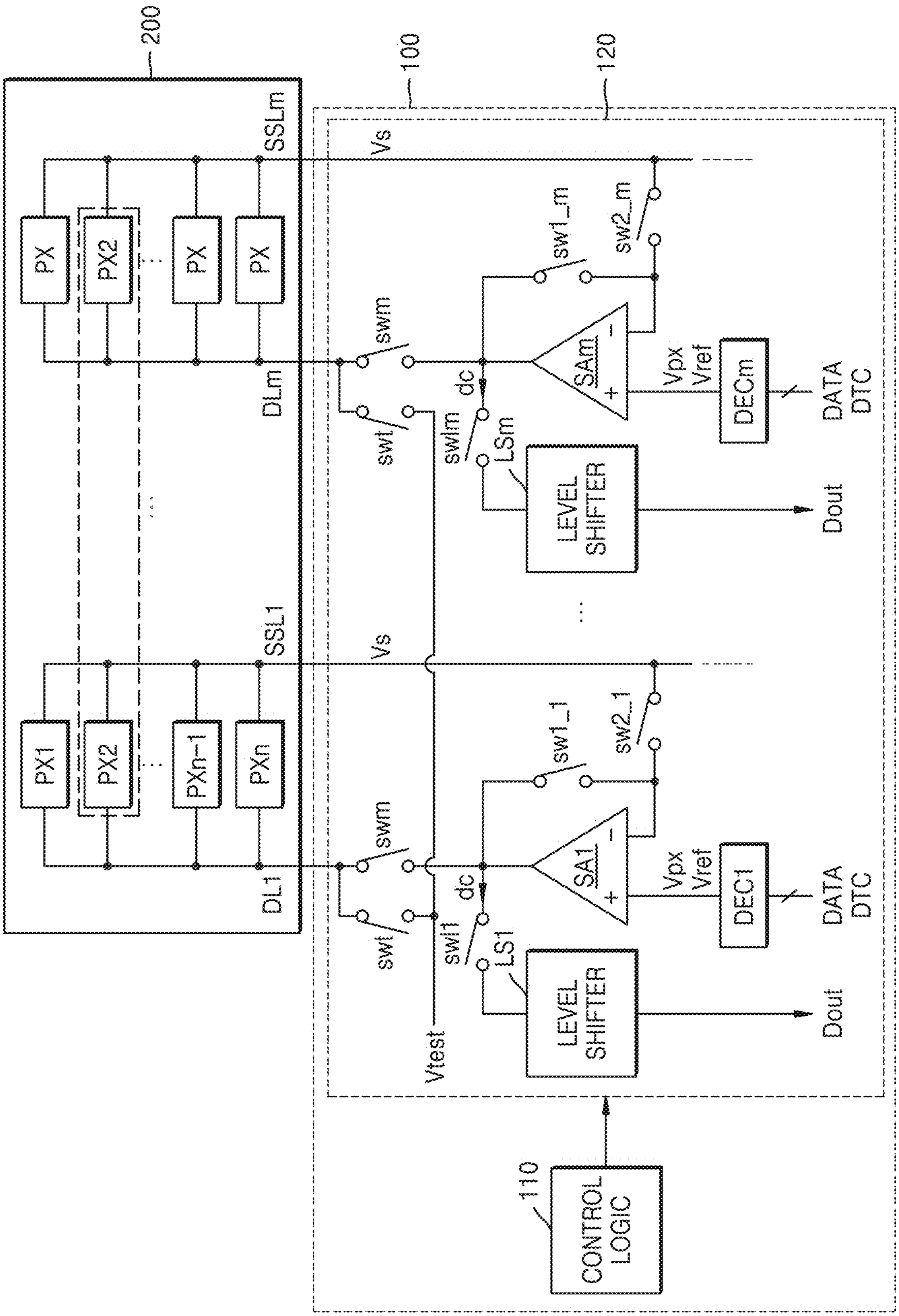
FIG. 2 is a diagram for describing a display driving circuit according to an embodiment.

FIG. 2 is a diagram for describing a display driving circuit according to an embodiment. The description of the display device 10 given above with reference to FIG. 1 may be applied to the embodiment illustrated in FIG. 2. Thus, redundant descriptions with those given above will be omitted for conciseness.

Referring to FIG. 2, a display device 10 may include a display panel 200 and a display driving circuit 100, and the display driving circuit 100 may include a control logic 110 and a data driver 120.

The display panel 200 may include a plurality of signal lines, for example, a plurality of data lines DL1 to DLm, a plurality of sensing lines SSL to SSLm, and a plurality of scan lines (e.g., the scan lines SL1 to SLn of FIG. 1). The data driver 120 may be connected to the display panel 200 through the plurality of data lines DL1 to DLm. The data driver 120 may be connected to the columns of pixels PX through the plurality of data lines DL1 to DLm. The data driver 120 may be connected to the display panel 200 through the plurality of sensing lines SSL1 to SSLm. The data driver 120 may be connected to the columns of pixels PX through the plurality of sensing lines SSL1 to SSLm. FIG. 2 illustrates that the number of data lines and the number of sensing lines are equal to each other. However, embodiments are not limited thereto and in some embodiments, the number of data lines and the number of sensing lines may be different from each other.

In an embodiment, the display driving circuit 100 may operate in a plurality of operation modes. The control logic 110 may control the display driving circuit 100 to operate in the plurality of operation modes. The control logic 110 may control the data driver 120 to operate according to the plurality of operation modes. The control logic 110 may provide the data driver 120 with control signals for the data driver 120 to operate according to the plurality of operation modes.

For example, the plurality of operation modes may include a first operation mode and a second operation mode. The first operation mode may refer to a display mode. In the first operation mode, the data driver 120 may convert pixel data (e.g., the pixel data DATA of FIG. 1) into a data voltage and output the same to the display panel 200 through the data line. The second operation mode may refer to a test mode. In the second operation mode, the data driver 120 may receive a sample voltage Vs from the pixel PX through the sensing line.

For example, the control logic 110 may control switching elements such that the data driver 120 operates in one of the first operation mode and the second operation mode. The data driver 120 may include a test switching element swt and a multiplexer (MUX) switching element swm. In the first operation mode, the test switching element swt may be turned off and the MUX switching element swm may be turned on. Because the MUX switching element swm is turned on, the output of a source amplifier may be applied to the pixel PX through the data line.

In the second operation mode, the test switching element swt may be turned on and the MUX switching element swm may be turned off. Because the test switching element swt is turned on, a test voltage Vtest may be applied to the pixel PX through the data line. However, a method by which the control logic 110 controls the data driver 120 according to the operation mode is not limited to the above example, and the data driver 120 may be controlled according to the operation mode in various ways.

The data driver 120 may include a plurality of decoders and a plurality of source amplifiers. The plurality of source amplifiers may respectively correspond to the plurality of decoders. The source amplifier corresponding to the decoder may refer to the source amplifier connected to the decoder. For example, a first source amplifier SA1 may correspond to a first decoder DEC1. Similarly, an m-th source amplifier SAm may correspond to an m-th decoder DECm.

Each of the plurality of source amplifiers may correspond to a data line. A source amplifier connected to a particular data line may be a source amplifier corresponding to a particular data line. For example, the first source amplifier SA1 may correspond to a first data line DL1. Similarly, the m-th source amplifier SAm may correspond to an m-th data line DLm. Each of the plurality of source amplifiers may correspond to a sensing line. A source amplifier connected to a particular sensing line may be a source amplifier corresponding to a particular sensing line. For example, the first source amplifier SA1 may correspond to a first sensing line SSL1. Similarly, the m-th source amplifier SAm may correspond to an m-th sensing line SSLm. FIG. 2 illustrates that the data line and the sensing line and the source amplifier and the decoder one-to-one correspond to each other. However, embodiments are not limited thereto.

Referring to FIG. 2, the display driving circuit 100 may include first switching elements and second switching elements. The data driver 120 may include first switching elements and second switching elements. FIG. 2 illustrates that the first switching elements and the second switching elements are included in the data driver 120. However, embodiments are not limited thereto and in some embodiments, the first switching elements and the second switching elements may be implemented as separate switching circuits from the data driver 120.

The first switching elements may be connected between a first input terminal and an output terminal of respective ones of the plurality of source amplifiers. In other words, in some embodiments, a first switching element may be provided for each of the plurality of source amplifiers. For example, a first switching element sw1_1 may be connected between the first input terminal and the output terminal of the first source amplifier SA1. Similarly, a first switching element sw1_m may be connected between the first input terminal and the output terminal of the m-th source amplifier SAm. In some embodiments, the first input terminal of the source amplifier may be an inverting input terminal. However, embodiments are not limited thereto and in some embodiments, the first input terminal may be a non-inverting input terminal.

The second switching elements may be connected between the first input terminal and a sensing line corresponding to respective ones of the plurality of source amplifiers. In other words, in some embodiments, a second switching element may be provided for each of the plurality of source amplifiers. For example, a second switching element sw2_1 may be connected between the first input terminal of the first source amplifier SA1 and the first sensing line SSL1. Similarly, a second switching element sw2_m may be connected between the first input terminal of the m-th source amplifier SAm and the m-th sensing line SSLm.

In the first operation mode, the decoder may receive pixel data DATA. The decoder may receive the pixel data DATA from the control logic 110. The decoder may convert the pixel data DATA and output a pixel voltage Vpx. The pixel data DATA provided to the decoder may be converted into a grayscale voltage through the decoder, and the pixel voltage Vpx corresponding to the pixel data DATA may be provided to the source amplifier. The pixel voltage Vpx may be provided to a second input terminal of the source amplifier. In some embodiments, the second input terminal of the source amplifier may be a non-inverting input terminal. However, embodiments are not limited thereto and in some embodiments, the second input terminal may be an inverting input terminal. For example, the first decoder DEC1 may select a grayscale voltage corresponding to first pixel data corresponding to the first data line DL1 and output the selected grayscale voltage as the pixel voltage Vpx. The first decoder DEC1 may provide the pixel voltage Vpx corresponding to the first pixel data to the first source amplifier SA1. The first source amplifier SA1 may receive the pixel voltage Vpx through the second input terminal. Similarly, the m-th decoder DECm may select a grayscale voltage corresponding to first pixel data corresponding to the m-th data line DLm and output the selected grayscale voltage as the pixel voltage Vpx. The m-th decoder DECm may provide the pixel voltage Vpx corresponding to the first pixel data to the m-th source amplifier SAm. The m-th source amplifier SAm may receive the pixel voltage Vpx through the second input terminal.

In the first operation mode, the source amplifier may amplify the pixel voltage Vpx. The source amplifier may amplify the grayscale voltage selected from the decoder. The source amplifier may also be referred to as a channel amplifier. The plurality of source amplifiers may amplify the pixel voltages corresponding to the plurality of decoders, respectively, and provide the amplified pixel voltages to the plurality of pixels through the data lines corresponding to the source amplifiers, respectively. For example, the first source amplifier SA1 may amplify the pixel voltage Vpx output from the first decoder DEC1. The amplified pixel voltage Vpx may be provided to a second pixel PX2. Similarly, the m-th source amplifier SAm may amplify the pixel voltage Vpx output from the m-th decoder DECm. The amplified pixel voltage Vpx may be provided to a second pixel PX2.

The control logic 110 may control first switching elements sw1 (specifically, sw1_1, . . . , sw1_m) and second switching elements sw2 (specifically, sw2_1, . . . , sw2_m) according to the operation mode. The control logic 110 may control the operation of the first switching elements sw1 and the second switching elements sw2 in the first operation mode and the second operation mode.

In an embodiment, the control logic 110 may control the first switching element sw1 and the second switching element sw2 such that the corresponding source amplifier amplifies the pixel voltage Vpx. The control logic 110 may turn on the first switching element sw1 and turn off the second switching element sw2 in the first operation mode.

For example, in the first operation mode, the first switching element sw1_1 may be turned on to form a feedback loop connecting the first input terminal and the output terminal of the first source amplifier SAI and may amplify the pixel voltage Vpx output from the first decoder DEC1. The second switching element sw2_1 may be turned off such that the sample voltage Vs output from the sensing line is not transmitted to the first source amplifier SA1. The amplified pixel voltage Vpx may be applied to the pixel PX through the first data line DL1. Similarly, in the first operation mode, the m-th switching element sw1_m may be turned on to form a feedback loop connecting the first input terminal and the output terminal of the m-th source amplifier SAm and may amplify the pixel voltage Vpx output from the m-th decoder DECm. The second switching element sw2_m may be turned off such that the sample voltage Vs output from the sensing line is not transmitted to the m-th source amplifier SAm. The amplified pixel voltage Vpx may be applied to the pixel PX through the m-th data line DLm.

In the second operation mode, the source amplifier may receive the sample voltage Vs from the pixel PX through the sensing line. The second operation mode may be a test mode for determining whether an error has occurred in the pixel PX. The second operation mode may include a plurality of operation periods. The second operation mode may include a reset period. The reset period may refer to a period in which the sample voltage Vs of the pixel connected to the source amplifier is initialized. The second operation mode may include a program period. The program period may refer to a period in which the sample voltage Vs is output through the sensing line. The sample voltage may represent the electrical characteristics of the pixel connected to the sensing line. The second operation mode may include a comparison period. The comparison period may refer to a period in which the source amplifier performs a comparison operation. The second operation mode will be described below in detail with reference to FIG. 6A.

In the comparison period, the decoder may receive test data DTC. For example, in some embodiments, the decoder may receive the test data DTC from the control logic 110. The decoder may convert the test data DTC and output a comparison voltage Vref. The test data DTC provided to the decoder may be converted into a grayscale voltage through the decoder and the comparison voltage Vref corresponding to the test data DTC may be provided to the source amplifier. The comparison voltage Vref may be provided to the second input terminal of the source amplifier. For example, the first decoder DEC1 may provide the comparison voltage Vref corresponding to the test data DTC to the first source amplifier SA1. The first source amplifier SAI may receive the comparison voltage Vref through the second input terminal thereof. Similarly, the m-th decoder DECm may provide the comparison voltage Vref corresponding to the test data DTC to the m-th source amplifier SAm. The m-th source amplifier SAm may receive the comparison voltage Vref through the second input terminal thereof.

In the comparison period, the source amplifier may perform a comparison operation. The comparison operation may refer to an operation in which the source amplifier compares the sample voltage Vs with the comparison voltage Vref and outputs comparison data dc. The source amplifier may receive the comparison voltage Vref from the decoder. The comparison voltage Vref may be input to the second input terminal thereof. The source amplifier may receive the sample voltage Vs output through the sensing line. The sample voltage Vs may be input to the first input terminal.

The control logic 110 may control the operation of the first switching elements sw1 and the second switching elements sw2 in the second operation mode. In an embodiment, each of the source amplifiers may perform a comparison operation in the comparison period based on the operation of the first switching element sw1 and the second switching element sw2 corresponding to the source amplifier.

The control logic 110 may control the first switching element sw1 and the second switching element sw2 to output the comparison data dc by comparing the sample voltage Vs input to the first input terminal through the sensing line with the comparison voltage Vref input to the second input terminal. The control logic 110 may turn off the first switching element sw1 and turn on the second switching element sw2 in the comparison period. For example, in the comparison period, the second switching element sw2_1 may be turned on such that the sample voltage Vs output from the sensing line may be transmitted to the first source amplifier SA1. The sample voltage Vs may be input to the first input terminal. The first switching element sw1_1 may be turned off such that the first source amplifier SA1 may perform a comparison operation of comparing the sample voltage Vs with the comparison voltage Vref. The first source amplifier SA1 may output the comparison data dc. Similarly, in the comparison period, the second switching element sw2_m may be turned on such that the sample voltage Vs output from the sensing line may be transmitted to the m-th source amplifier SAm. The sample voltage Vs may be input to the first input terminal. The first switching element sw1_m may be turned off such that the m-th source amplifier SAm may perform a comparison operation of comparing the sample voltage Vs with the comparison voltage Vref. The m-th source amplifier SAm may output the comparison data dc.

The display driving circuit 100 may further include a level shifter. The level shifter may shift the level of the comparison data dc. For example, the level shifter may be a level down shifter. The level shifter may decrease the voltage level of the comparison data dc output from the source amplifier.

The display driving circuit 100 may include a level switching element sw1. The control logic 110 may control the operation of the level switching element sw1 in the second operation mode. The control logic 110 may turn on the level switching element sw1 in the comparison period. When the level switching element sw1 is turned on, the level shifter may generate output data Dout by shifting the level of the comparison data dc. For example, when the first level switching element sw11 is turned on, a first level shifter LS1 may receive the comparison data dc from the first source amplifier SA1. The first level shifter LS1 may decrease the voltage level of the comparison data DC to a logic level. Similarly, when the m-th level switching element sw1*m* is turned on, an m-th level shifter LSm may receive the comparison data dc from the m-th source amplifier SAm. The m-th level shifter LSm may decrease the voltage level of the comparison data DC to a logic level.

In an embodiment, based on the comparison data dc, the control logic 110 may determine whether an error has occurred in each of the pixels PX. The control logic 110 may receive the output data Dout generated by shifting the level of the comparison data dc and determine, based on the output data Dout, whether an error has occurred in each of the pixels PX. For example, based on the comparison data dc output from the first source amplifier SA1, the control logic 110 may determine whether an error occurred in the second pixel PX2 connected to the first source amplifier SA1 through the data line DL. Based on the output data Dout output from the first level shifter LS1, the control logic 110 may determine whether an error has occurred in the second pixel PX2. Similarly, based on the comparison data dc output from the m-th source amplifier SAm, the control logic 110 may determine whether an error occurred in the second pixel PX2 connected to the m-th source amplifier SAm through the m-th data line DLm. Based on the output data Dout output from the m-th level shifter LSm, the control logic 110 may determine whether an error has occurred in the second pixel PX2.

As for the display driving circuit 100 and the display device 10 according to various embodiments, because a separate existing source amplifier may perform a comparison operation, even when a separate comparator is not added therein, the display driving circuit 100 and the display device 10 may identify whether an error has occurred in the pixel. Thus, the cost required for a test operation may be reduced and the size of the display driving circuit 100 may be reduced. In other words, a display device according to the related art requires a separate comparator in order to perform the test operation. By contrast, since the existing source amplifier SA1, . . . . SAm according to various embodiments may perform the comparison operation used for the test operation and thus the display driving circuit 100 and the display device 10 may identify whether an error has occurred in the pixel.

Figure 3:
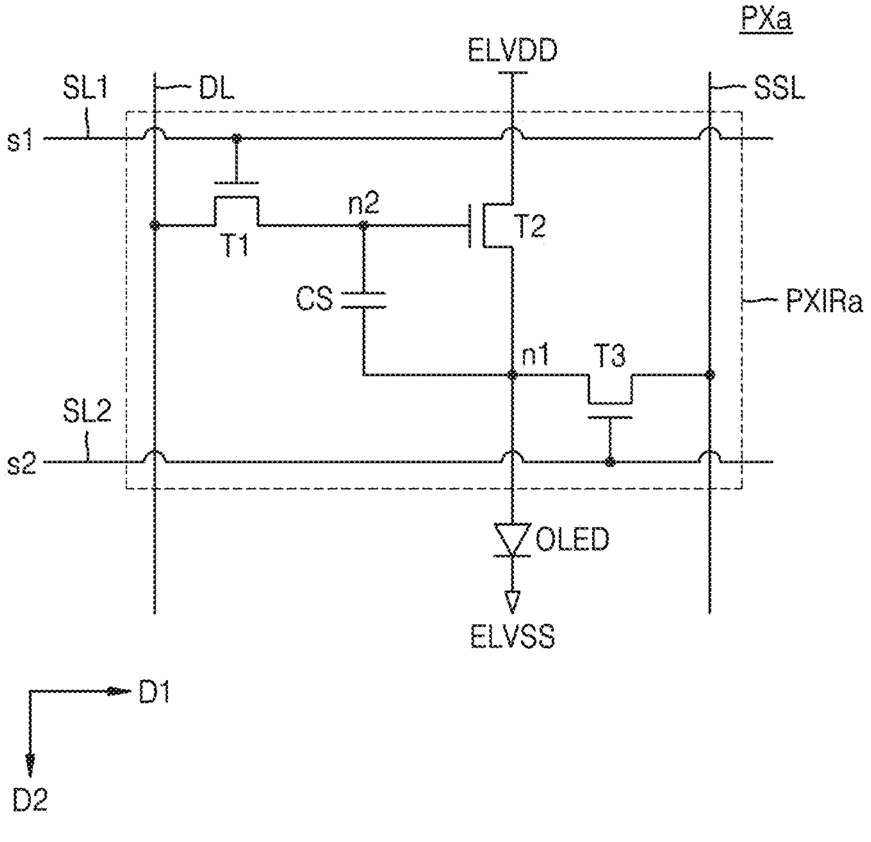
FIG. 3 is a circuit diagram illustrating an example of a pixel according to an embodiment.

FIG. 3 is a circuit diagram illustrating an example of a pixel according to an embodiment. A pixel PXa of FIG. 3 may be an example of the pixel PX of FIG. 1 and FIG. 2. The pixel PXa of FIG. 3 may be applied to the display device 10 of FIG. 1.

The pixel PXa may include an OLED and a pixel circuit PXIRa. The pixel PXa may include a first scan line SL1 extending in a first direction D1, a second scan line SL2 extending in the first direction D1, a data line DL extending in a second direction D2 intersecting with the first direction D1, a sensing line SSL extending in the second direction D2, a first transistor T1, a second transistor T2, and a third transistor T3, a storage capacitor CS, and an OLED. For example, the first direction D1 may be an X-axis direction and the second direction D2 may be a Y-axis direction. However, the configuration and structure of the pixel PXa of FIG. 3 is only an example of the circuit of the pixel PXa, and the configuration and structure of the pixel PXa may be variously modified.

A first driving voltage may be applied to the pixel PXa from a first driving power supply ELVDD, and a second driving voltage may be applied from a second driving power supply ELVSS. The first driving power supply ELVDD may be relatively higher than the second driving power supply ELVSS. The pixel circuit PXIRa may include first to third transistors T1 to T3 and a storage capacitor CS. At least one of the first to third transistors T1 to T3 may include an amorphous silicon (a-Si) thin film transistor (TFT), a polysilicon (poly-Si) TFT, an oxide TFT, an organic TFT, or the like. In an embodiment, at least one of the first to third transistors T1 to T3 may be formed as an N-type transistor. However, embodiments are not limited thereto, and at least one of the first to third transistors T1 to T3 may be formed as a P-type transistor.

The first transistor T1 may be connected between the data line DL and a second node n2 and may operate in response to a scan signal s1 applied through the first scan line SL1. In the first operation mode, the first transistor T1 may be turned on by the scan signal s1 applied through the first scan line SL1, to provide the second node n2 with a pixel voltage supplied through the data line DL from the data driver (e.g., the data driver 120 of FIG. 1).

The second transistor T2 may be connected between the first driving power supply ELVDD and a first node n1 and may operate in response to a voltage applied through the second node n2. In the first operation mode, the first driving voltage may be applied to a first terminal of the second transistor T2, and the amount of the current flowing through the second transistor T2 may be determined based on the voltage difference between the first node n1 and the second node n2. The amount of the current flowing through the second transistor T2 may be supplied to the OLED.

The third transistor T3 may be connected between the first node n1 and the sensing line SSL and may operate in response to a scan signal s2 applied through the second scan line SL2. In the first operation mode, the third transistor T3 may be turned on by the scan signal s2 applied through the second scan line SL2, to provide the first node n1 with an initialization voltage supplied through the sensing line SSL from the data driver. In an embodiment, in the second operation mode, the third transistor T3 may be turned on by a signal applied through the second scan line SL2, to provide a sample voltage to the data driver. For example, in the second operation mode, the third transistor T3 may provide a voltage of the first node n1 to the data driver through the sensing line SSL.

The storage capacitor CS may store the difference between the voltage applied to the second node n2 through the first transistor T1 and the voltage applied to the first node n1 through the third transistor T3.

The OLED may be connected to a second terminal of the second transistor T2, the first node n1, and the second driving power supply ELVSS. The OLED may include an anode connected to the first node n1, a cathode to which the second driving power supply ELVSS is applied, and an organic emission layer between the cathode and the anode. The OLED may generate light in the organic emission layer when a current is supplied thereto from the second transistor T2. The intensity of the light may be proportional to the current.

Figure 4:
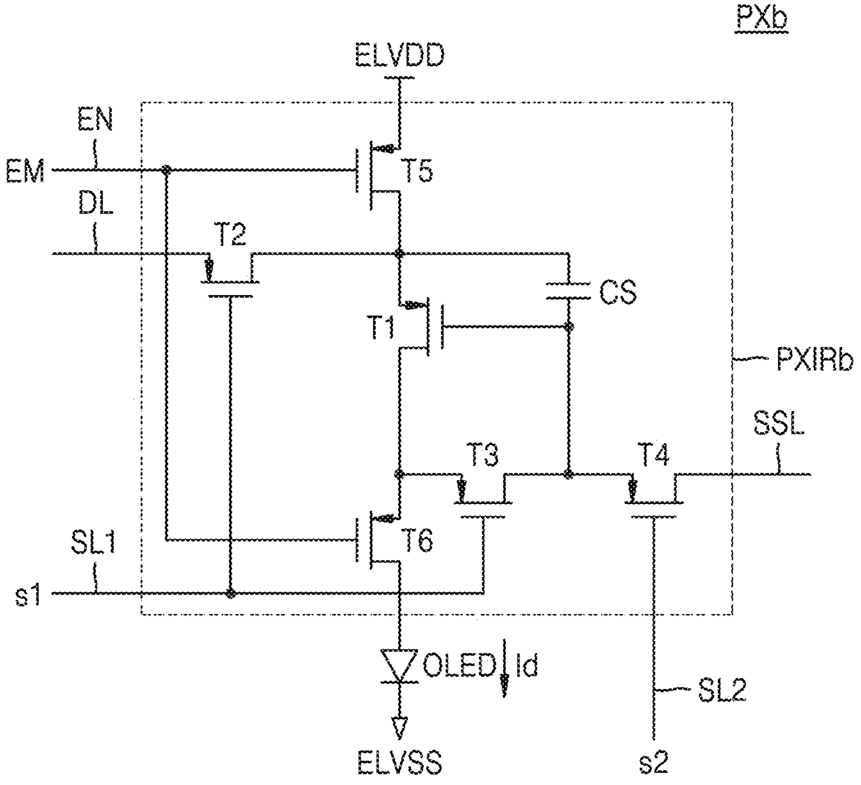
FIG. 4 is a circuit diagram illustrating an example of a pixel according to an embodiment.

FIG. 4 is a circuit diagram illustrating an example of a pixel according to an embodiment. A pixel PXb of FIG. 4 may be an example of the pixel PX of FIG. 1 and the pixel PX of FIG. 2. The pixel PXb of FIG. 4 may be applied to the display device 10 of FIG. 1.

The pixel PXb may include an OLED and a pixel circuit PXIRb. The pixel PXb may include six transistors. The pixel PXb may include a first scan line SL1, a second scan line SL2, a data line D1, a sensing line SSL, a first transistor T1, a second transistor T2, a third transistor T3, a fourth transistor T4, a fifth transistor T5, and a sixth transistor T6, a storage capacitor CS, and an OLED. However, the configuration and structure of the pixel PXb of FIG. 4 is only an example of the pixel circuit PXIRb, and in some embodiments, the configuration and structure of the pixel PXb may be variously modified.

A first driving voltage may be applied to the pixel PXb from a first driving power supply ELVDD, and a second driving voltage may be applied from a second driving power supply ELVSS. The pixel circuit PXIRb may include first to sixth transistors T1 to T6 and a storage capacitor CS. At least one of the first to sixth transistors T1 to T6 may be implemented as an oxide semiconductor thin film transistor including an active layer including an oxide semiconductor, an LTPS thin film transistor including an active layer including polysilicon, or a metal oxide semiconductor field effect transistor (MOSFET). In an embodiment, at least one of the first to sixth transistors T1 to T6 may be formed as a P-type transistor. However, embodiments are not limited thereto, and in some embodiments, at least one of the first to sixth transistors T1 to T6 may be formed as an N-type transistor.

A gate electrode of the first transistor T1 may be connected to one end of the storage capacitor CS. A source electrode of the first transistor T1 may be connected to the fifth transistor T5 and the other end of the storage capacitor CS, and a drain electrode of the first transistor T1 may be connected to the sixth transistor T6. In the first operation mode, the first transistor T1 may receive a pixel voltage supplied through the data line DL according to a switching operation of the second transistor T2 and supply a driving current Id to the OLED.

A gate electrode of the second transistor T2 may be connected to the first scan line SL1, a source electrode of the second transistor T2 may be connected to the data line DL, and a drain electrode of the second transistor T2 may be connected to the first transistor T1 and the fifth transistor T5. The second transistor T2 may be turned on according to a scan signal received through the first scan line SL1, to transmit a pixel voltage supplied through the data line DL, to the first transistor T1.

A gate electrode of the third transistor T3 may be connected to the first scan line SL1, a source electrode of the third transistor T3 may be connected to the first transistor T1, and a drain of the third transistor T3 may be connected to the first transistor T1 and one end of the storage capacitor CS. The third transistor T3 may be turned on according to a scan signal received through the first scan line SL1, to connect the gate electrode and the drain electrode of the first transistor T1 to each other.

A gate electrode of the fourth transistor T4 may be connected to the second scan line SL2, a source electrode of the fourth transistor T4 may be connected to the sensing line SSL, and a drain electrode of the fourth transistor T4 may be connected to one end of the storage capacitor CS, the third transistor T3, and the first transistor T1. In an embodiment, the fourth transistor T4 may be turned on according to a scan signal received through the first scan line SL1, to provide an initialization voltage to the sensing line SSL. The fourth transistor T4 may be turned on according to a scan signal received through the first scan line SL1, to provide a sample voltage to the data driver through the sensing line SSL.

A gate electrode of the fifth transistor T5 may be connected to an emission control line EN, a source electrode of the fifth transistor T5 may be connected to the first driving power supply ELVDD, and a drain electrode of the fifth transistor T5 may be connected to the first transistor T1.

A gate electrode of the sixth transistor T6 may be connected to the emission control line EN, a source electrode of the sixth transistor T6 may be connected to the first transistor T1 and the third transistor T3, and a drain electrode of the sixth transistor T6 may be connected to the OLED. The fifth transistor T5 and the sixth transistor T6 may be simultaneously turned on according to an emission control signal EM received through the emission control line EN, and a current may flow through the OLED.

One end of the storage capacitor CS may be connected to the first transistor T1, and the other end may be connected to the first transistor T1.

The OLED may be connected to the drain electrode of the sixth transistor T6. The OLED may include an anode connected to the drain electrode of the sixth transistor T6, a cathode to which the second driving power supply ELVSS is applied, and an organic emission layer between the cathode and the anode. The OLED may generate light in the organic emission layer when a current is supplied thereto from the sixth transistor T6.

Figure 5:
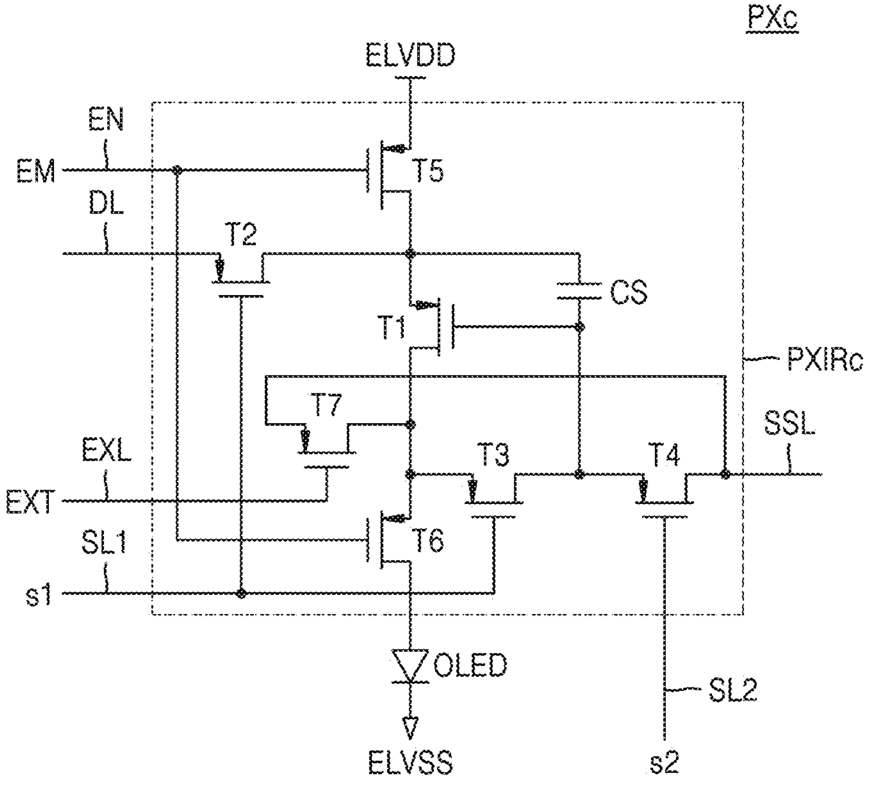
FIG. 5 is a circuit diagram illustrating an example of a pixel according to an embodiment.

FIG. 5 is a circuit diagram illustrating an example of a pixel according to an embodiment. A pixel PXc of FIG. 5 may be an example of the pixel PX of FIG. 1 and the pixel PX of FIG. 2. The pixel PXc of FIG. 5 may be applied to the display device 10 of FIG. 1. Compared to the pixel PXb of FIG. 4, the pixel PXc of FIG. 5 may further include a seventh transistor T7. Redundant descriptions with those given above with reference to FIG. 4 will be omitted for conciseness.

The pixel PXc may include seven transistors. The pixel PXc may include a first scan line SL1, a second scan line SL2, a data line D1, a sensing line SSL, first to seventh transistors T1 to T7, a storage capacitor CS, and an OLED. However, the configuration and structure of the pixel PXc of FIG. 5 is only an example of a pixel circuit PXIRc, and in some embodiments, the configuration and structure of the pixel PXc may be variously modified.

At least one of the first to seventh transistors T1 to T7 may be implemented as an oxide semiconductor thin film transistor including an active layer including an oxide semiconductor, an LTPS thin film transistor including an active layer including polysilicon, or a MOSFET. In an embodiment, at least one of the first to seventh transistors T1 to T7 may be formed as a P-type transistor. However, embodiments are not limited thereto, and in some embodiments, at least one of the first to seventh transistors T1 to T7 may be formed as an N-type transistor.

The seventh transistor T7 may be connected between the third transistor T3 and the fourth transistor T4. The seventh transistor T7 may operate in response to a control signal EXT. In response to the control signal EXT, the seventh transistor T7 may be turned on. The seventh transistor T7 may be turned on to electrically connect the third transistor T3 and the sensing line SSL to each other. The pixels described above with reference to FIGS. 3 to 5 may operate in the first operation mode and the second operation mode. Hereinafter, the operation of the pixel and the display driving circuit in the second operation mode will be described.

Figure 6A:
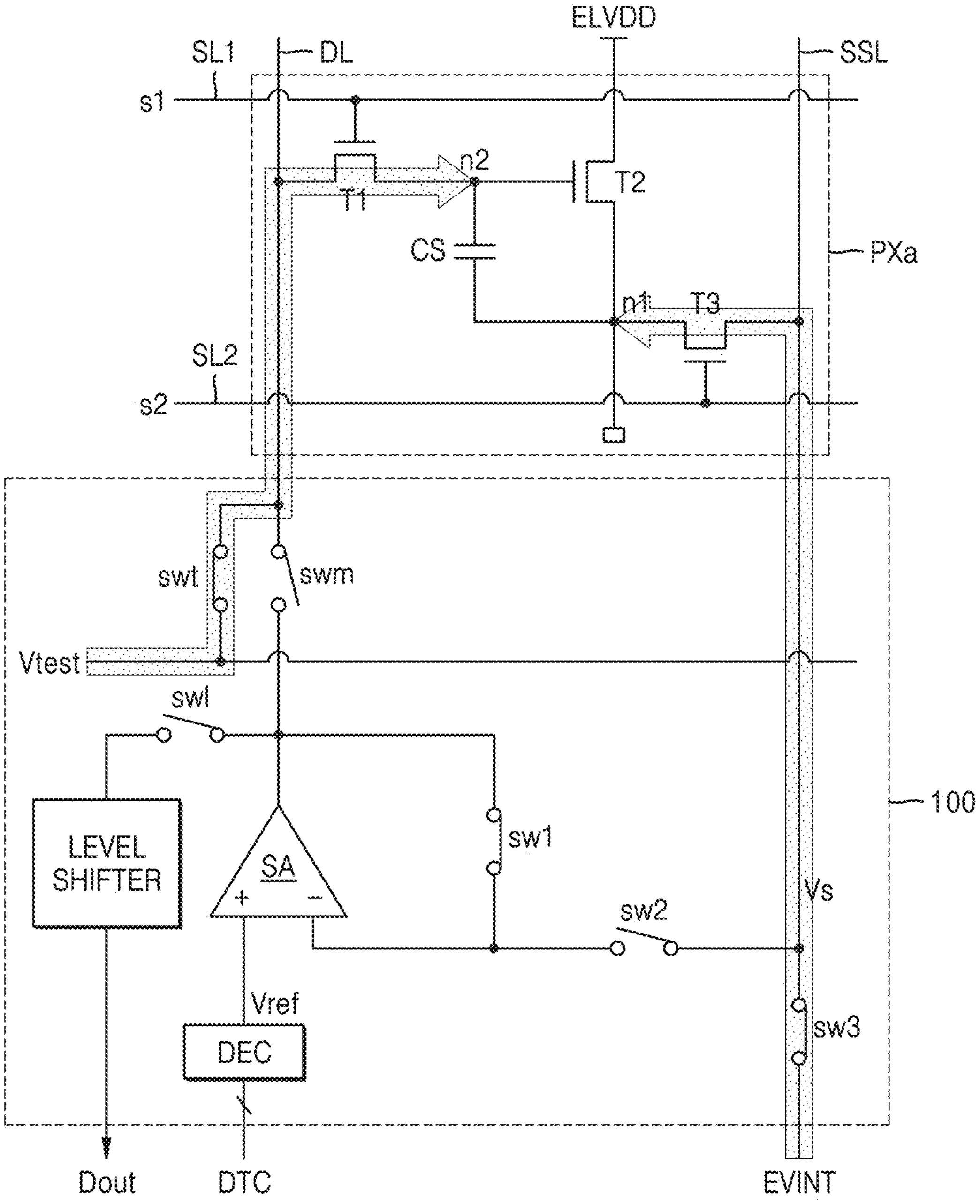
FIG. 6A is a diagram for describing a reset period according to an embodiment.
Figure 6B:
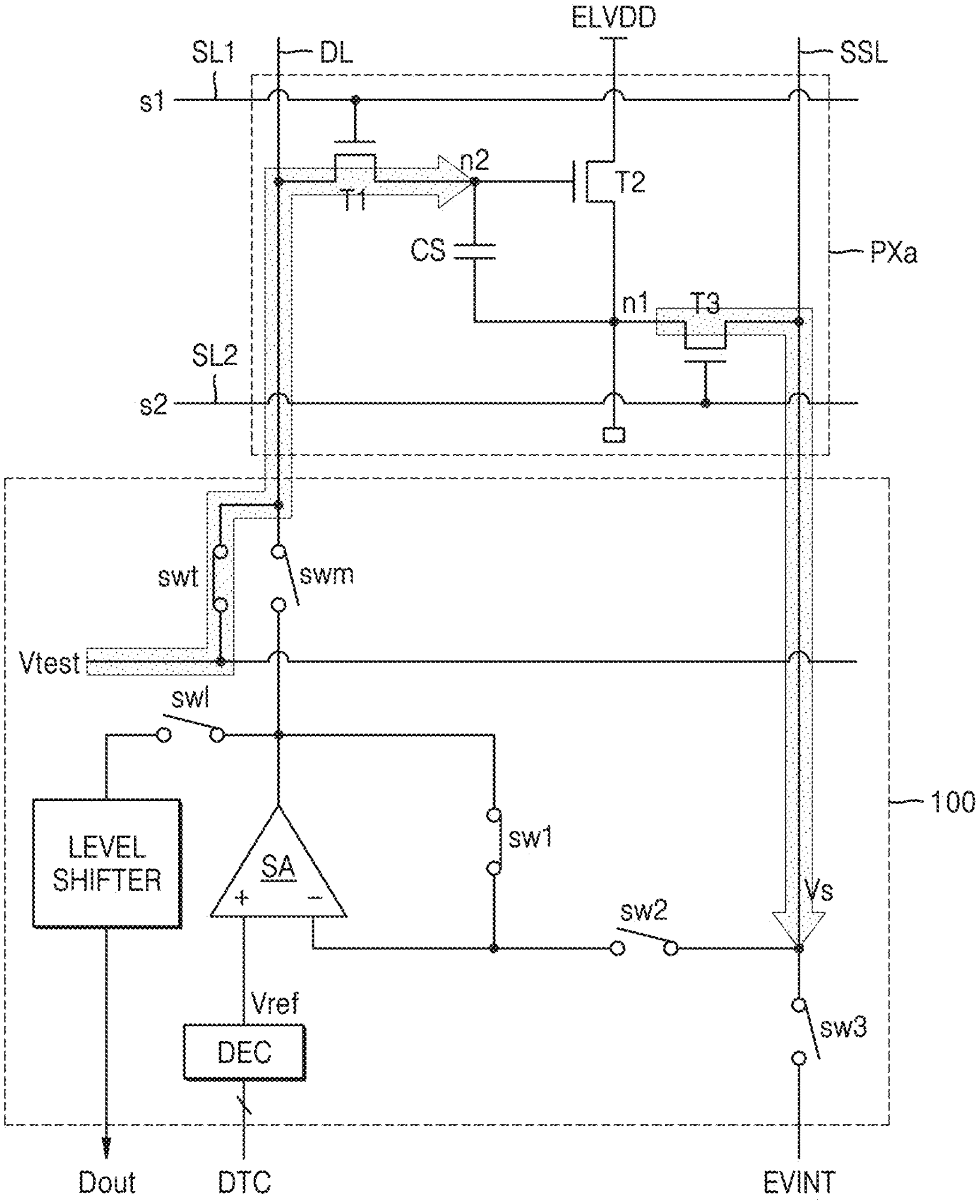
FIG. 6B is a diagram for describing a program period according to an embodiment.
Figure 6C:
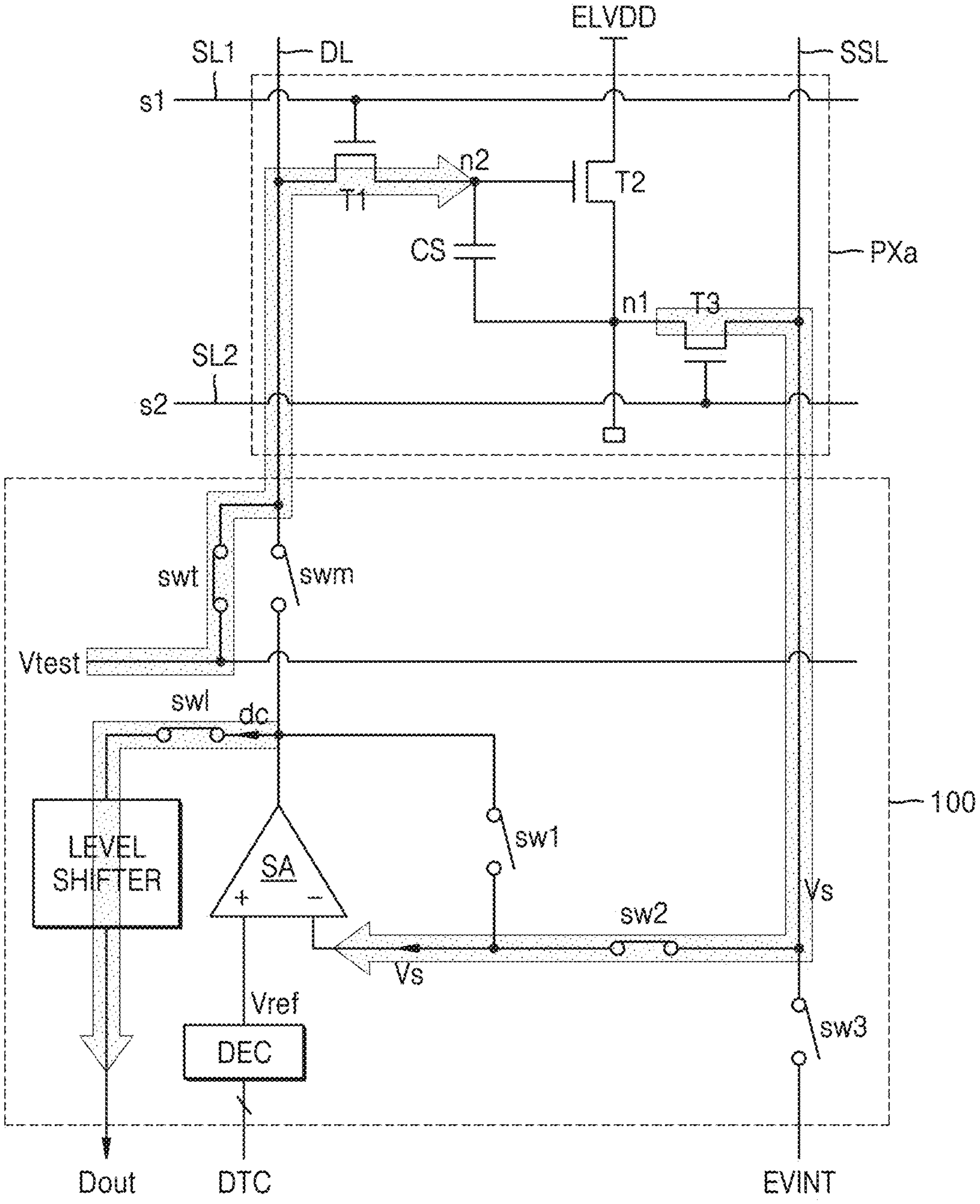
FIG. 6C is a diagram for describing a comparison period according to an embodiment.
Figure 7:
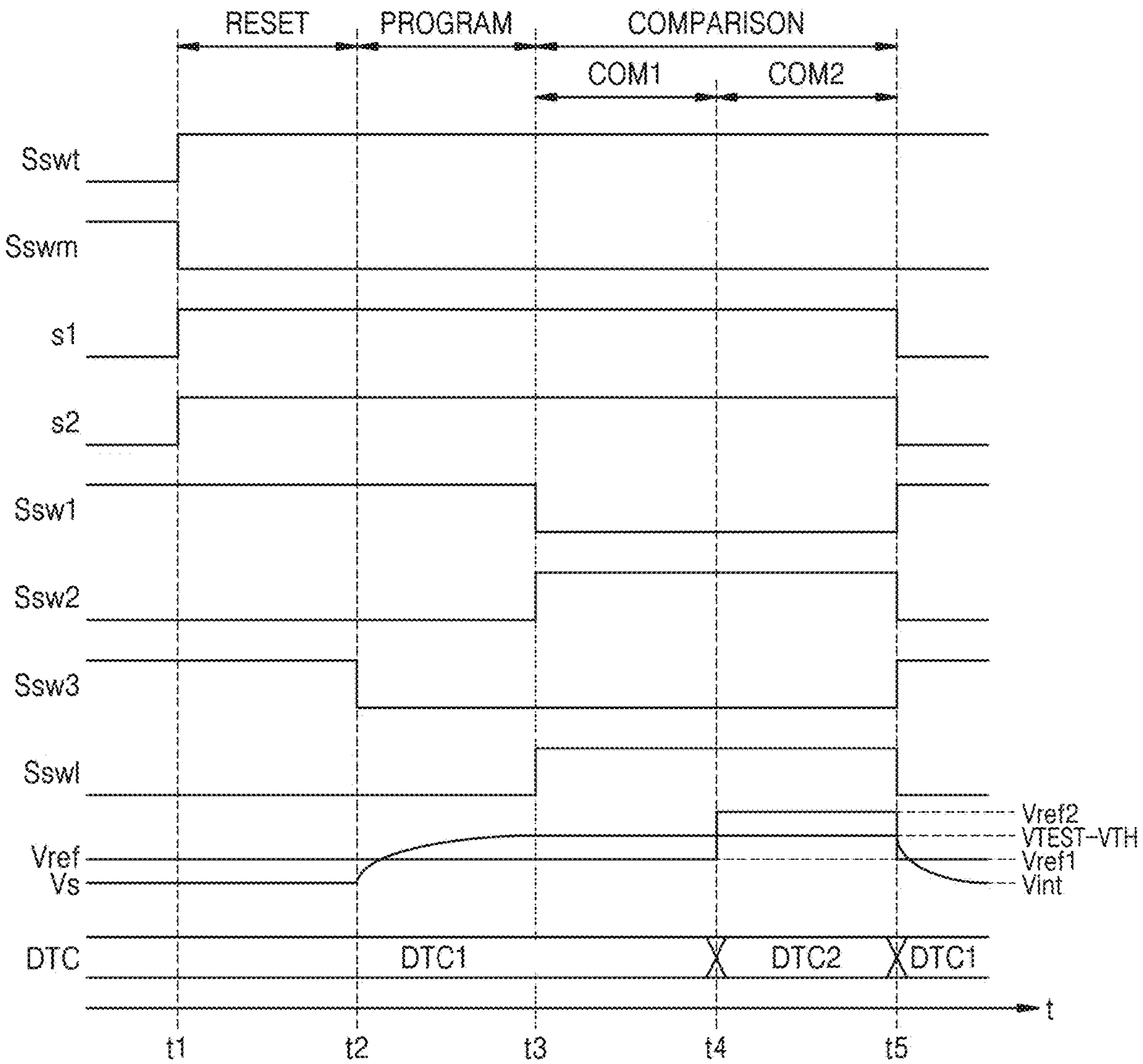
FIG. 7 is a timing diagram illustrating a plurality of signals for controlling a pixel and a display driving circuit, according to an embodiment.

FIG. 6A is a diagram for describing a reset period according to an embodiment. FIG. 6B is a diagram for describing a program period according to an embodiment. FIG. 6C is a diagram for describing a comparison period according to an embodiment. FIG. 7 is a timing diagram illustrating a plurality of signals for controlling a pixel and a display driving circuit, according to an embodiment.

For convenience of description, at least one pixel PX and at least a portion of the display driving circuit 100 are illustrated in FIGS. 6A, 6B, and 6C. However, the description of FIGS. 6A to 6C is not limited to the diagrams illustrated in FIGS. 6A to 6C. In some embodiments, the test mode that is the second operation mode may be performed before the OLED is deposited. Because an operation of the pixel and the display driving circuit in the second operation mode will be described below, the OLED is omitted from the pixel PXa for convenience of description and conciseness.

FIGS. 6A to 6C illustrate that the pixel PXa includes three transistors. However, embodiments are not limited thereto and in some embodiments, the pixel PXa may include various numbers of transistors and the description of FIGS. 6A to 6C may be applied to pixels PXa with various structures. Hereinafter, FIGS. 6A and 7 will be referred to together. Additionally, FIGS. 6A to 6C describe the operation with respect to a single source amplifier SA. It will be understood that a similar operation applies to other ones of the source amplifiers.

Referring to FIGS. 6A and 7, the second operation mode may include a reset period. The reset period may be from a first time t1 to a second time t2. The reset period may refer to a period in which the sample voltage Vs of the pixel PXa connected to the source amplifier SA is initialized. In the reset period, a test voltage Vtest for determining an error in the pixel PXa may be applied to the pixel PXa through the data line DL. In an embodiment, the control logic (e.g., the control logic 110 of FIG. 1) may apply the test voltage Vtest to the pixel PXa through the data line DL.

The control logic may control the test switching element swt and the MUX switching element swm. The control logic may output a control signal Sswt for controlling the test switching element swt and a control signal Sswm for controlling the MUX switching element swm. The test switching element swt may operate in response to the control signal Sswt. The MUX switching element swm may operate in response to the control signal Sswm.

In the reset period, the control signal Sswt may be of an active level (e.g., high level or first level) and the control signal Sswm may be of an inactive level (e.g., low level or second level). The test switching element swt may be turned on based on the control signal Sswt of the active level. The MUX switching element swm may be turned off based on the control signal Sswm of the inactive level. In the reset period, the test switching element swt may be turned on and the MUX switching element swm may be turned off such that the test voltage Vtest may be applied to the data line DL.

In the reset period, the first transistor T1 may be turned on. The first scan signal s1 may be of an active level. In response to the first scan signal s1 of the active level, the first transistor T1 may be turned on and the first transistor T1 may transmit the test voltage Vtest provided through the data line D1, to the second node n2.

In the reset period, an initialization voltage Vint for initializing the sample voltage Vs output to the sensing line SSL of the pixel PXa may be applied to the pixel PXa through the sensing line SSL. In an embodiment, the control logic may apply the initialization voltage Vint to the pixel PXa through the sensing line SSL. The initialization voltage Vint may be provided from an initialization power supply EVINT.

In an embodiment, the display driving circuit 100 may include a third switching element sw3 connected between the initialization power supply EVINT and the sensing line SSL, as illustrated in FIGS. 6A-6C. The control logic may control the third switching element sw3. The control logic may output a control signal Ssw3 for controlling the third switching element sw3. The third switching element sw3 may operate in response to the control signal Ssw3.

The display driving circuit 100 may include a first switching element sw1 and a second switching element sw2. The first switching element sw1 may be connected between the output terminal and the first input terminal of the source amplifier SA. The second switching element sw2 may be connected between the sensing line SSL and the first input terminal of the source amplifier SA. The control logic may control the first switching element sw1 and the second switching element sw2. The control logic may output a control signal Ssw1 for controlling the first switching element sw1 and a control signal Ssw2 for controlling the second switching element sw2. The first switching element sw1 may operate in response to the control signal Ssw1. The second switching element sw2 may operate in response to the control signal Ssw2.

In the reset period, the control signal Ssw1 may be of an active level and the control signal Ssw2 may be of an inactive level. The first switching element sw1 may be turned on based on the control signal Ssw1 of the active level, and the second switching element sw2 may be turned off based on the control signal Ssw2 of the inactive level.

In the reset period, the control signal Ssw3 may be of an active level. The third switching element sw3 may be turned on based on the control signal Ssw3 of the active level. In some embodiments, in the reset period, the control logic may turn on the first switching element sw1 and the third switching element sw3 and turn off the second switching element sw2 to apply the initialization voltage Vint to the pixel PXa through the third switching element sw3 and the sensing line SSL.

In the reset period, the third transistor T3 may be turned on. The second scan signal s2 may be of an active level. In response to the second scan signal s2 of the active level, the third transistor T3 may be turned on and the third transistor T3 may transmit the initialization voltage Vint provided through the sensing line SSL, to the first node n1. The storage capacitor CS may store the difference between the test voltage Vtest and the initialization voltage Vint.

In an embodiment, the display driving circuit 100 may include a level switching element sw1. In the reset period, the control logic may control the level switching element sw1. The control logic may output a control signal Ssw1 to control the level switching element sw1. The level switching element sw1 may operate in response to the control signal Ssw1. In the reset period, the control signal Ssw1 may be of an inactive level. The level switching element sw1 may be turned off based on the control signal Ssw1 of the inactive level.

In the reset period, the decoder DEC may receive test data DTC. The control logic may provide first test data DTC1. In the reset period, first test data DTC1 may be provided thereto, and a first comparison voltage Vref1 corresponding to the first test data DTC1 may be provided to the source amplifier SA. The first comparison voltage Vref1 of a level corresponding to the first test data DTC1 may be provided to the source amplifier SA. FIG. 7 illustrates that the first test data DTC1 is provided in the reset period. However, embodiments are not limited thereto and, in some embodiments, second test data DTC2 may be provided in the reset period or the test data DTC may not be provided in the reset period. Because the initialization voltage Vint is applied through the sensing line SSL, the sample voltage Vs may be the initialization voltage Vint.

FIG. 6B is a diagram for describing a program period according to an embodiment. Redundant descriptions with those given above with reference to FIG. 6A will be omitted for conciseness.

Referring to FIGS. 6B and 7, the second operation mode may include a program period. The program period may be from the second time t2 to a third time t3. The program period may refer to a period in which the sample voltage Vs is output through the sensing line SSL. The program period may follow the reset period.

In the program period, the control signal Sswt may be of an active level and the control signal Sswm may be of an inactive level. The test switching element swt may maintain the turn-on state based on the control signal Sswt of the active level. The MUX switching element swm may maintain the turn-off state based on the control signal Sswm of the inactive level. In the program period, the test switching element swt and the MUX switching element swm may maintain the state of the reset period. The test voltage Vtest may continue to be applied to the data line DL.

In the program period, the first transistor T1 may maintain the turn-on state. In the program period, because the first scan signal s1 continues to be of the active level, the first transistor T1 may maintain the turn-on state as in the reset period in response to the first scan signal s1 of the active level.

In the program period, the control signal Ssw1 may be of an active level and the control signal Ssw2 may be of an inactive level. The first switching element sw1 may maintain the turn-on state because the control signal Ssw1 continues to be of the active level. The second switching element sw2 may maintain the turn-off state because the control signal Ssw2 continues to be of the inactive level.

In the program period, the sample voltage Vs may be output through the sensing line SSL. In the program period, the control logic may control the third switching element sw3. In the program period, the control signal Ssw3 may be of an inactive level. At the second time t2, the control signal Ssw3 may transition from the active level to the inactive level. In the program period, the third switching element sw3 may be turned off based on the control signal Ssw3 of the inactive level. In the program period, the control logic may turn off the third switching element sw3 such that the sample voltage Vs may be output through the sensing line SSL.

In the program period, the third transistor T3 may maintain the turn-on state. In response to the second scan signal s2 of the active level, the third transistor T3 may be turned on and the third transistor T3 may provide the voltage of the first node n1 as the sample voltage Vs through the sensing line SSL.

In the program period, the control logic may control the level switching element sw1. In the program period, the control signal Ssw1 may maintain the inactive level. The level switching element sw1 may maintain the turn-off state based on the control signal Ssw1 of the inactive level.

In the program period, the first comparison voltage Vref1 of a level corresponding to the first test data DTC1 may be provided to the source amplifier SA. FIG. 7 illustrates that the first test data DTC1 is provided in the program period. However, embodiments are not limited thereto and, in some embodiments, the second test data DTC2 may be provided in the program period or the test data DTC may not be provided in the program period. The sample voltage Vs may be output through the sensing line SSL.

FIG. 6C is a diagram for describing a comparison period according to an embodiment. Redundant descriptions with those given above will be omitted for conciseness.

Referring to FIGS. 6C and 7, the second operation mode may include a comparison period. The comparison period may be from the third time t3 to a fifth time t5. The comparison period may refer to a period in which the source amplifier SA performs a comparison operation. The comparison period may follow the program period.

In an embodiment, the comparison period may include a first comparison period COM1 and a second comparison period COM2. In some embodiments, the first comparison period COM1 may refer to a period in which the source amplifier SA performs a comparison operation based on the first comparison voltage Vref1, and the second comparison period COM2 may refer to a period in which the source amplifier SA performs a comparison operation based on a second comparison voltage Vref2. The second comparison period COM2 may follow the first comparison period COM1. For example, the first comparison period COM1 may be from the third time t3 to a fourth time t4, and the second comparison period COM2 may be from the fourth time t4 to the fifth time t5. However, embodiments are not limited thereto and, in some embodiments, the second comparison period COM2 may precede the first comparison period COM1.

In the comparison period, the control signal Sswt may be of an active level and the control signal Sswm may be of an inactive level. The test switching element swt may maintain the turn-on state based on the control signal Sswt of the active level. The MUX switching element swm may maintain the turn-off state based on the control signal Sswm of the inactive level.

In the comparison period, the first transistor T1 may maintain the turn-on state. The first transistor T1 may be turned on in response to the first scan signal s1 of the active level.

In the comparison period, the third switching element sw3 may maintain the turn-off state. In response to the control signal Ssw3 of the inactive level, the third switching element sw3 may maintain the turn-off state.

In an embodiment, in the comparison period, the first switching element sw1 and the second switching element sw2 may be controlled. The control logic may control the first switching element sw1 and the second switching element sw2. The first switching element sw1 may operate in response to the control signal Ssw1. The second switching element sw2 may operate in response to the control signal Ssw2.

In the comparison period, the control signal Ssw1 may be of an inactive level. At the third time t3, the control signal Ssw1 may transition from the active level to the inactive level. In the comparison period, the first switching element sw1 may be turned off based on the control signal Ssw1 of the inactive level. Because the first switching element sw1 is turned off, the first input terminal and the output terminal of the source amplifier SA may not be connected to each other and the source amplifier SA may operate as a comparator.

In the comparison period, the control signal Ssw2 may be of an active level. At the third time t3, the control signal Ssw2 may transition from the inactive level to the active level. In the comparison period, the second switching element sw2 may be turned on based on the control signal Ssw2 of the active level. Because the second switching element sw2 is turned on, the first input terminal of the source amplifier SA and the sensing line SSL may be connected to each other and the sample voltage Vs may be provided to the first input terminal of the source amplifier SA.

In the comparison period, the control logic may provide a comparison voltage Vref. In some embodiments, the control logic may provide different comparison voltages Vref in the first comparison period COM1 and the second comparison period COM2. In an embodiment, the control logic may provide the first comparison voltage Vref1 to the source amplifier SA in the first comparison period COM1. Particularly, in the first comparison period COM1, the control logic may provide the first test data DTC1 to the decoder DEC. The decoder DEC may output the first comparison voltage Vref1 corresponding to the first test data DTC1. The first comparison voltage Vref1 corresponding to the first test data DTC1 may be provided to the source amplifier SA. The first comparison voltage Vref1 of a level corresponding to the first test data DTC1 may be provided to the second input terminal of the source amplifier SA.

In the comparison period, the source amplifier SA may output the comparison data dc by comparing the sample voltage Vs input to the first input terminal with the comparison voltage Vref input to the second input terminal. In an embodiment, in the first comparison period COM1, the source amplifier SA may output first comparison data by comparing the sample voltage Vs with the first comparison voltage Vref1.

In an embodiment, the control logic may provide the second comparison voltage Vref2 to the source amplifier SA in the second comparison period COM2. Particularly, in the second comparison period COM2, the control logic may provide the second test data DTC2 to the decoder DEC. The decoder DEC may output the second comparison voltage Vref2 corresponding to the second test data DTC2. For example, in some embodiments, the second comparison voltage Vref2 may be greater in level than the first comparison voltage Vref1. The second comparison voltage Vref2 corresponding to the second test data DTC2 may be provided to the source amplifier SA. The second comparison voltage Vref2 of a level corresponding to the second test data DTC2 may be provided to the second input terminal of the source amplifier SA. In the second comparison period COM2, the source amplifier SA may output second comparison data by comparing the sample voltage Vs with the second comparison voltage Vref2.

In the comparison period, the control signal Ssw1 may be of an active level. At the third time t3, the control signal Ssw1 may transition from the inactive level to the active level. In the comparison period, the level switching element sw1 may be turned on based on the control signal Ssw1 of the active level. Because the level switching element sw1 is turned on, the output of the source amplifier SA may be provided to the level shifter. In the comparison period, the comparison data dc may be provided to the level shifter. For example, in some embodiments, the first comparison data may be provided to the level shifter in the first comparison period COM1, and the second comparison data may be provided to the level shifter in the second comparison period COM2. In a normal operation period (not illustrated in FIGS. 6A-6C and 7), the control signal Sswt may be of an inactive level and the control signal Sswm may be of an active level. The test switching element swt may be in the turn-off state based on the control signal Sswt of the inactive level. The MUX switching element swm may be in the turn-on state based on the control signal Sswm of the active level. In this way, the display driving circuit 100 may operate in a normal (non-test) operation mode/period in which the source amplifier SA performs amplification rather than comparison.

In an embodiment, the display driving circuit 100 may determine whether an error has occurred in at least a portion of the pixel PXa. The control logic may determine, based on the first comparison data and the second comparison data, whether an error has occurred in the pixel PXa. Particularly, the control logic may receive, from the level shifter, first output data obtained by converting the first comparison data and second output data obtained by converting the second comparison data. The control logic may determine, based on the first output data and the second output data, whether an error has occurred in the pixel PXa. In some embodiments, the control logic may be configured to output an error signal indicating whether an error has occurred in the pixel PXa. For example, in some embodiments, the error signal may be a flag. In some embodiments, an action may be taken to correct the pixel PXa in which an error has occurred based on the error signal. For example, the display panel 200 may be routed during manufacturing for a corrective action to fix or replace the pixel PXa. However, embodiments are not limited to the control logic determining whether the error has occurred. In some embodiments, the test equipment outside the display device may receive the first output data and the second output data and may determine, based on the first output data and the second output data, whether an error has occurred in a portion of the pixel PXa. An accurate determination may be made at a low cost because the source amplifier SA operates as a comparator to output the comparison data dc and it is determined, based on the comparison data dc, whether an error has occurred in the pixel PXa.

Figure 8A:
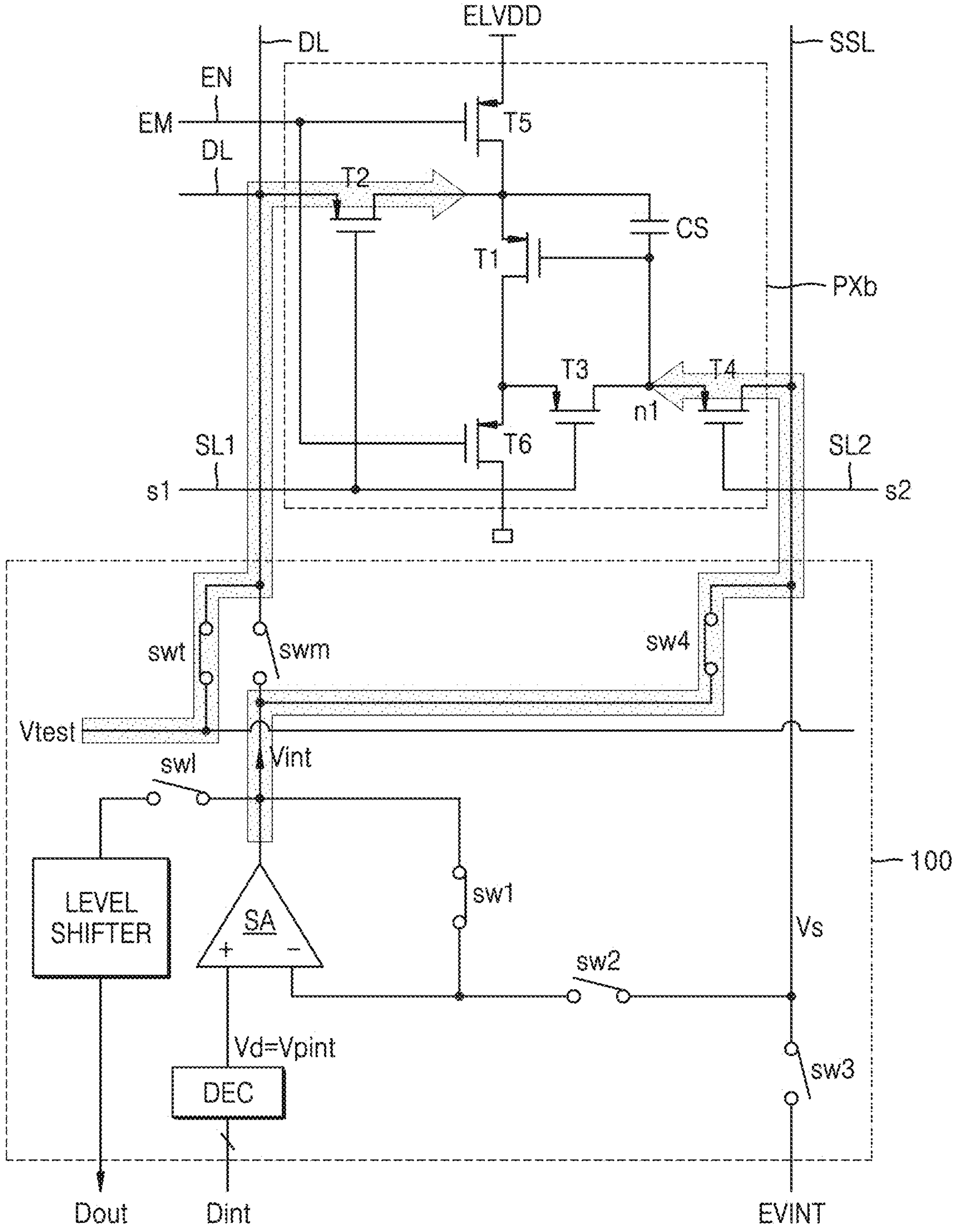
FIG. 8A is a diagram for describing a reset period according to an embodiment.
Figure 8B:
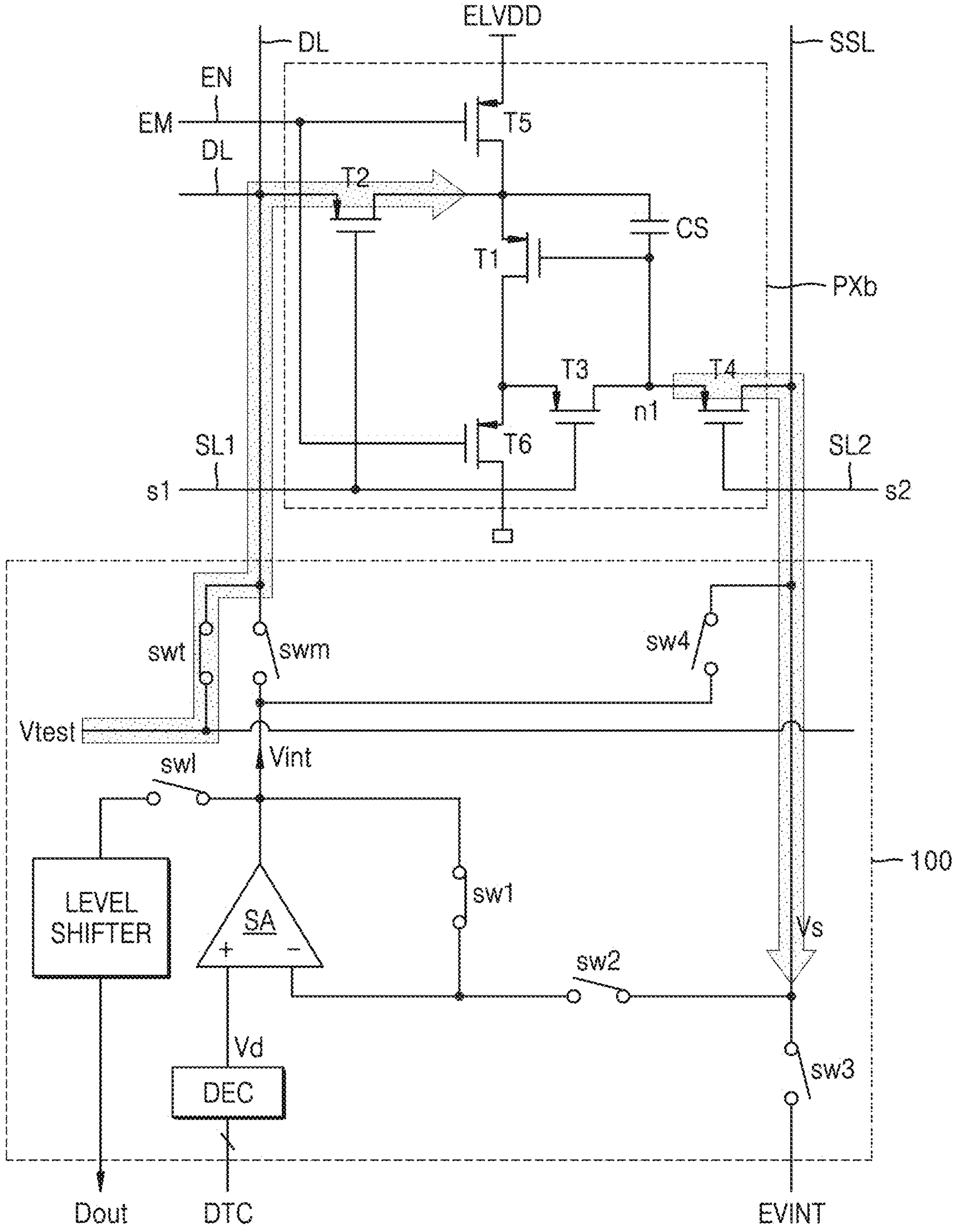
FIG. 8B is a diagram for describing a program period according to an embodiment.
Figure 8C:
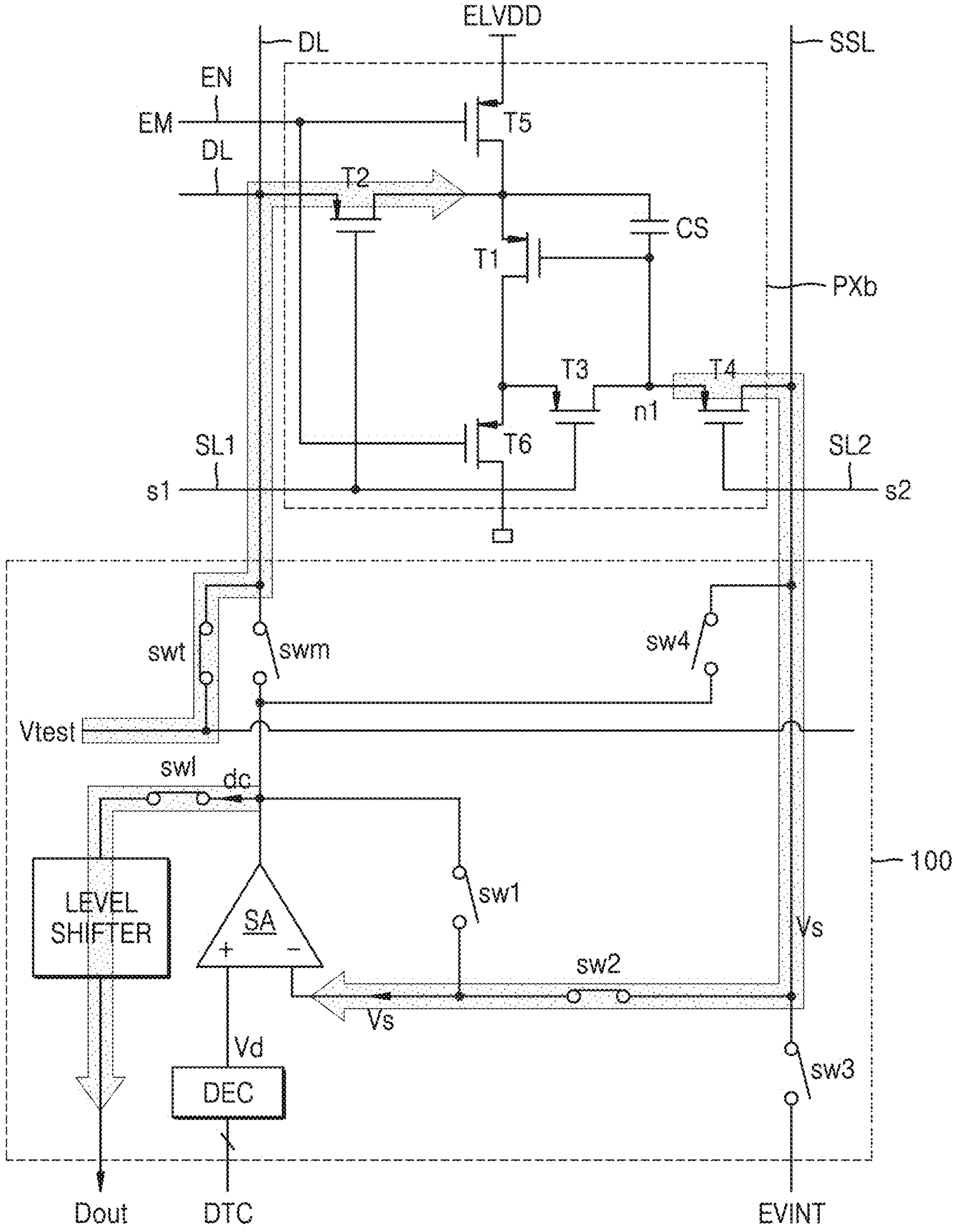
FIG. 8C is a diagram for describing a comparison period according to an embodiment.
Figure 9:
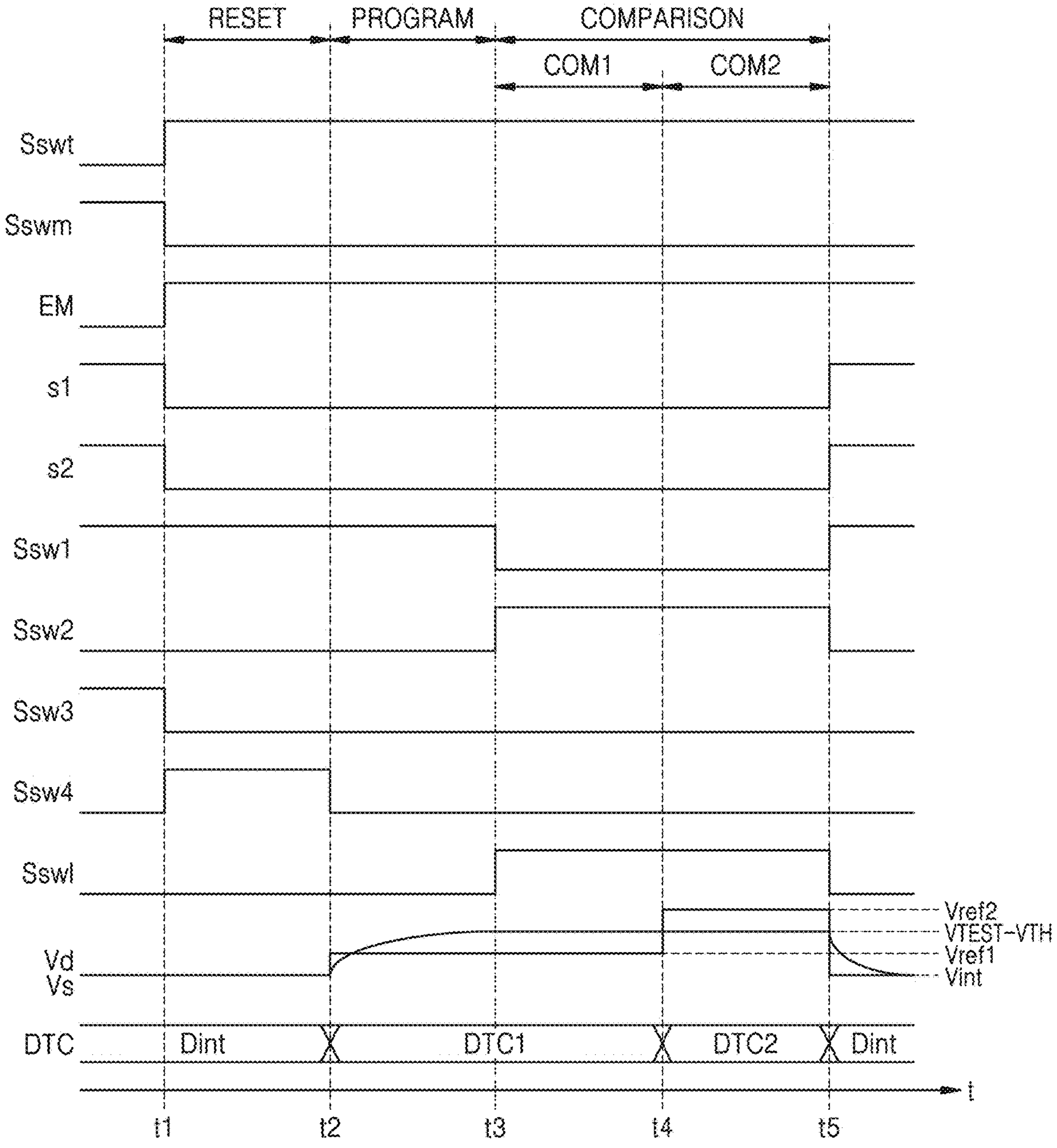
FIG. 9 is a timing diagram illustrating a plurality of signals for controlling a pixel and a display driving circuit, according to an embodiment.

FIG. 8A is a diagram for describing a reset period according to an embodiment. FIG. 8B is a diagram for describing a program period according to an embodiment. FIG. 8C is a diagram for describing a comparison period according to an embodiment. FIG. 9 is a timing diagram illustrating a plurality of signals for controlling a pixel and a display driving circuit, according to an embodiment. FIGS. 8A to 9 illustrate an embodiment in which the source amplifier SA applies the initialization voltage Vint. Redundant descriptions with those given above will be omitted for conciseness.

FIGS. 8A to 8C illustrate that the pixel PXb includes six transistors. However, embodiments are not limited thereto and, in some embodiments, the pixel PXb may include various numbers of transistors and the description of FIGS. 8A to 8C may be applied to pixels PXb with various structures. Hereinafter, FIGS. 8A and 9 will be referred to together.

Referring to FIGS. 8A and 9, the second operation mode may include a reset period. The reset period may be from a first time t1 to a second time t2. In an embodiment, the control logic (e.g., the control logic 110 of FIG. 1) may apply the test voltage Vtest to the pixel PXb through the data line DL.

In the reset period, the control signal Sswt may be of an active level and the control signal Sswm may be of an inactive level. In the reset period, the test switching element swt may be turned on and the MUX switching element swm may be turned off such that the test voltage Vtest may be applied to the data line DL.

In the reset period, the second transistor T2 may be turned on. The first scan signal s1 may be of an inactive level. In response to the first scan signal s1 of the inactive level, the second transistor T2 may be turned on and the second transistor T2 may transmit the test voltage Vtest provided through the data line D1, to the first transistor T1. In the reset period, the third transistor T3 may be turned on. The third transistor T3 may be turned on in response to the first scan signal s1 of the inactive level.

In the reset period, the fifth transistor T5 and the sixth transistor T6 may be turned off. The fifth transistor T5 and the sixth transistor T6 may operate in response to the emission control signal EM applied through the emission control line EN. In the reset period, the emission control signal EM may be of an active level. The fifth transistor T5 and the sixth transistor T6 may be turned off in response to the emission control signal EM of the active level.

In the reset period, the initialization voltage Vint may be applied to the pixel PXb. In an embodiment, the control logic may apply the initialization voltage Vint to the pixel PXb through the source amplifier SA. The initialization voltage Vint may be provided from the source amplifier SA.

In an embodiment, the display driving circuit 100 may include a fourth switching element sw4 connected between the output terminal of the source amplifier SA and the sensing line SSL. The control logic may control the fourth switching element sw4. The control logic may output a control signal Ssw4 for controlling the fourth switching element sw4. The fourth switching element sw4 may operate in response to the control signal Ssw4.

In the reset period, the control signal Ssw1 may be of an active level and the control signal Ssw2 may be of an inactive level. The first switching element sw1 may be turned on based on the control signal Ssw1 of the active level, and the second switching element sw2 may be turned off based on the control signal Ssw2 of the inactive level.

In the reset period, the control signal Ssw4 may be of an active level. The fourth switching element sw4 may be turned on based on the control signal Ssw4 of the active level. In the reset period, the control logic may turn on the first switching element sw1 and the fourth switching element sw4 to apply the initialization voltage Vint to the pixel PXb through the fourth switching element sw4 from the output terminal of the source amplifier SA. The control logic may turn off the second switching element sw2 so as not to connect the first input terminal of the source amplifier SA to the sensing line SSL.

In the reset period, the fourth transistor T4 may be turned on. The second scan signal s2 may be of an inactive level. In response to the second scan signal s2 of the inactive level, the fourth transistor T4 may be turned on and the fourth transistor T4 may transmit the initialization voltage Vint provided from the source amplifier SA, to the first node n1.

In the reset period, the control signal Ssw3 for controlling the third switching element sw3 may be of an inactive level. The third switching element sw3 may be turned off based on the control signal Ssw3 of the inactive level. The control signal Ssw1 may be of an inactive level. The level switching element sw1 may be turned off based on the control signal Ssw1 of the inactive level.

In the reset period, the decoder DEC may receive initialization data Dint. The control logic may provide initialization data Dint. In the reset period, the initialization data Dint may be provided to the decoder DEC and a decoder voltage Vd may be output. An output voltage Vd corresponding to the initialization data Dint may be provided to the source amplifier SA. The output voltage Vd corresponding to the initialization data Dint may be a preliminary initialization voltage Vpint, and the preliminary initialization voltage Vpint may be provided to the second input terminal of the source amplifier SA. The source amplifier SA may amplify the preliminary initialization voltage Vpint and output the initialization voltage Vint.

Because the display driving circuit 100 according to an embodiment may directly apply the initialization voltage Vint to the pixel PXb by using the source amplifier SA, the initialization voltage Vint may be applied rapidly. Thus, the test operation may be performed rapidly.

FIG. 8B is a diagram for describing a program period according to an embodiment. Redundant descriptions with those given above with reference to FIG. 8A will be omitted for conciseness.

Referring to FIGS. 8B and 9, the second operation mode may include a program period. The program period may be from the second time t2 to a third time t3. In the program period, because the control signal Sswt is of an active level and the control signal Sswm is of an inactive level, the test switching element swt may maintain the turn-on state and the MUX switching element swm may maintain the turn-off state.

In the program period, because the first scan signal s1 is of an inactive level, the second transistor T2 and the third transistor T3 may maintain the turn-on state. In the program period, because the emission control signal EM is of an active level, the fifth transistor T5 and the sixth transistor T6 may maintain the turn-off state. In the program period, the control signal Ssw1 may be of an active level and the control signal Ssw2 may be of an inactive level. The first switching element sw1 may be in a turn-on state, and the second switching element sw2 may be in a turn-off state.

In an embodiment, in the program period, the control logic may control the fourth switching element sw4. In the program period, the control signal Ssw4 may be of an inactive level. At the second time t2, the control signal Ssw4 may transition from the active level to the inactive level. The fourth switching element sw4 may be turned off based off the control signal Ssw4 of the inactive level. In the program period, the control logic may turn off the fourth switching element sw4 such that the sample voltage Vs of the pixel PXb may be output through the sensing line SSL.

In the program period, because the second scan signal s2 is of an inactive level, the fourth transistor T4 may maintain the turn-on state. The fourth transistor T4 may provide the voltage of the first node n1 as the sample voltage Vs through the sensing line SSL. In an embodiment, the sample voltage Vs may be the difference between the test voltage Vtest and a threshold voltage VTH of the first transistor T1.

In the program period, the level switching element sw1 may maintain the turn-off state based on the control signal Ssw1 of the inactive level.

In the program period, the first comparison voltage Vref1 of a level corresponding to the first test data DTC1 may be provided to the source amplifier SA. In the program period, the first test data DTC1 may be provided to the decoder DEC and the first comparison voltage Vref1 may be output as the decoder voltage Vd. The first comparison voltage Vref1 may be provided to the second input terminal of the source amplifier SA. FIG. 9 illustrates that the first test data DTC1 is provided in the program period. However, embodiments are not limited thereto and, in some embodiments, the second test data DTC2 may be provided in the program period or the test data DTC may not be provided in the program period. The sample voltage Vs may be output through the sensing line SSL.

FIG. 8C is a diagram for describing a comparison period according to an embodiment. Redundant descriptions with those given above will be omitted for conciseness.

Referring to FIGS. 8C and 9, the second operation mode may include a comparison period. The comparison period may be from the third time t3 to a fifth time t5. The comparison period may include a first comparison period COM1 and a second comparison period COM2.

In the comparison period, the test switching element swt may maintain the turn-on state based on the control signal Sswt of the active level. The MUX switching element swm may maintain the turn-off state based on the control signal Sswm of the inactive level.

In the comparison period, the fifth transistor T5 and the sixth transistor T6 may maintain the turn-off state in response to the emission control signal EM of the active level. In the comparison period, the second transistor T2 and the third transistor T3 may maintain the turn-on state in response to the first scan signal s1 of the inactive level. In the comparison period, the fourth transistor T4 may maintain the turn-on state in response to the second scan signal s2 of the inactive level.

In the comparison period, the third switching element sw3 may maintain the turn-off state in response to the control signal Ssw3 of the inactive level. In the comparison period, the fourth switching element sw4 may maintain the turn-off state in response to the control signal Ssw4 of the inactive level.

In an embodiment, in the comparison period, the first switching element sw1 and the second switching element sw2 may be controlled. In the comparison period, the control signal Ssw1 may be of an inactive level. At the third time t3, the control signal Ssw1 may transition from the active level to the inactive level. In the comparison period, the first switching element sw1 may be turned off based on the control signal Ssw1 of the inactive level. In the comparison period, the control signal Ssw2 may be of an active level. At the third time t3, the control signal Ssw2 may transition from the inactive level to the active level. In the comparison period, the second switching element sw2 may be turned on based on the control signal Ssw2 of the active level. The sample voltage Vs may be provided to the first input terminal of the source amplifier SA.

In an embodiment, the control logic may provide the first comparison voltage Vref1 to the source amplifier SA in the first comparison period COM1. In the first comparison period COM1, the source amplifier SA may output first comparison data by comparing the sample voltage Vs with the first comparison voltage Vref1.

In an embodiment, the control logic may provide the second comparison voltage Vref2 to the source amplifier SA in the second comparison period COM2. In the second comparison period COM2, the source amplifier SA may output second comparison data by comparing the sample voltage Vs with the second comparison voltage Vref2.

In the comparison period, the control signal Ssw1 may be of an active level. At the third time t3, the control signal Ssw1 may transition from the inactive level to the active level. Because the level switching element sw1 is turned on, the output of the source amplifier SA may be provided to the level shifter. The first comparison data may be provided to the level shifter in the first comparison period COM1, and the second comparison data may be provided to the level shifter in the second comparison period COM2.

Figure 10A:
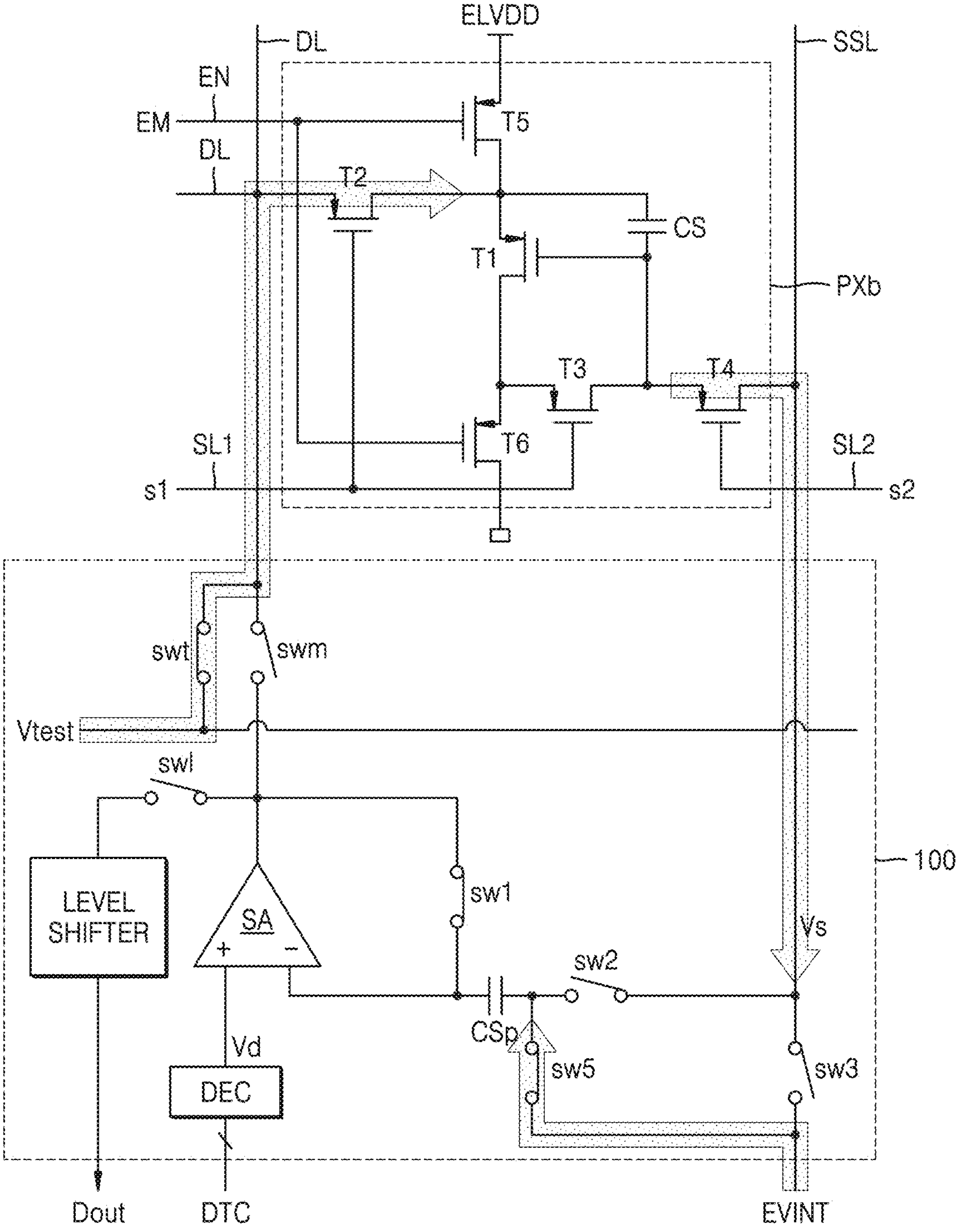
FIG. 10A is a diagram for describing an offset correction period according to an embodiment.
Figure 10B:
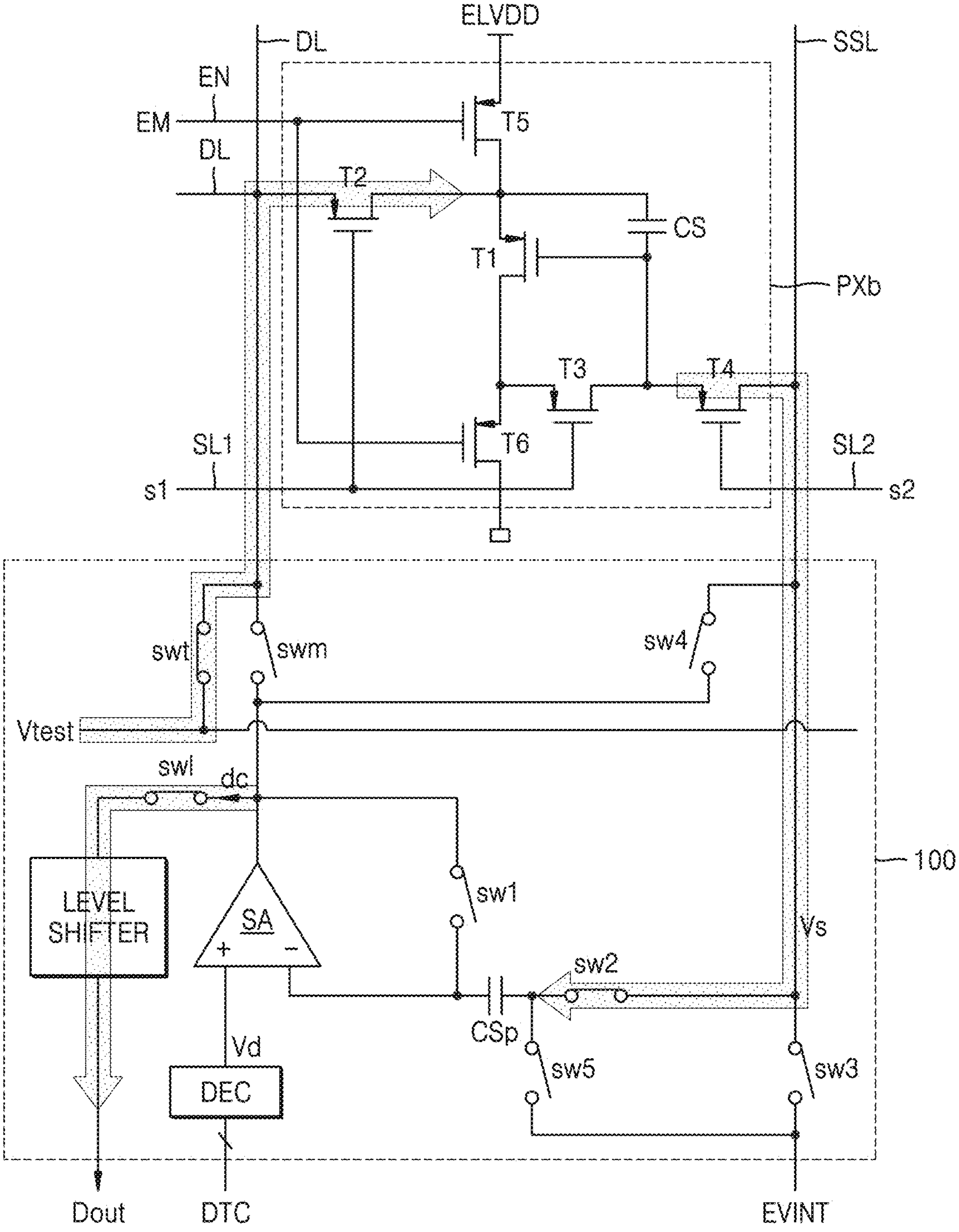
FIG. 10B is a diagram for describing a comparison period after an offset correction period according to an embodiment.
Figure 11:
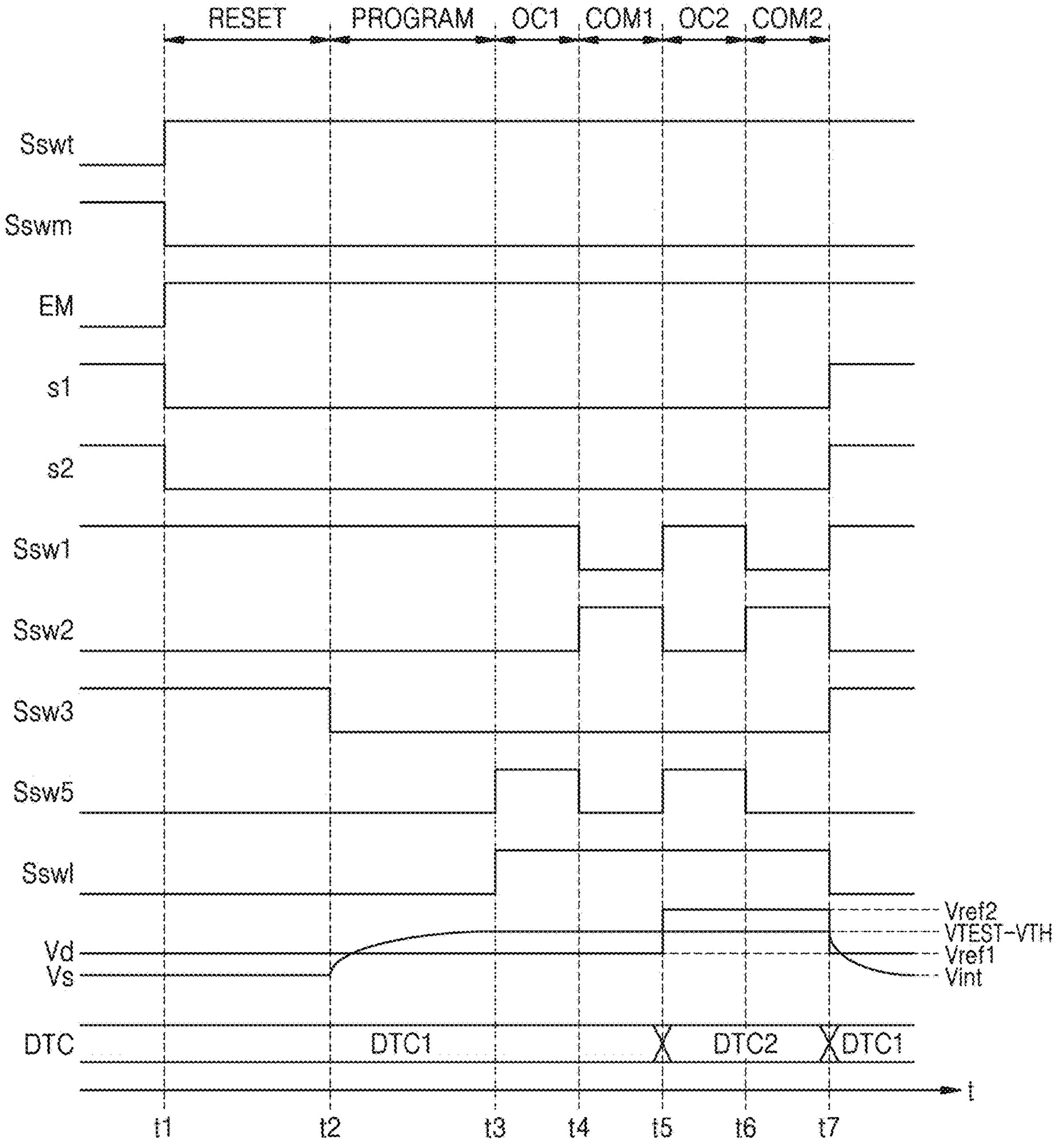
FIG. 11 is a timing diagram illustrating a plurality of signals for controlling a pixel and a display driving circuit, according to an embodiment.

FIG. 10A is a diagram for describing an offset correction period according to an embodiment. FIG. 10B is a diagram for describing a comparison period after an offset correction period according to an embodiment. FIG. 11 is a timing diagram illustrating a plurality of signals for controlling a pixel and a display driving circuit, according to an embodiment. Redundant descriptions with those given above will be omitted for conciseness.

FIGS. 10A and 10B illustrate that the pixel PXb includes six transistors. However, embodiments are not limited thereto and, in some embodiments, the pixel PXb may include various numbers of transistors and the description of FIGS. 10A to 11 may be applied to pixels PXb with various structures. Hereinafter, FIGS. 10A and 11 will be referred to together.

Referring to FIGS. 10A and 11, in the reset period and the program period, the pixel PXb and the display driving circuit 100 may operate similarly to those described above with reference to FIGS. 6A to 9. The second operation mode may include an offset correction period. The offset correction period may refer to a period for correcting the offset of the source amplifier SA. The offset correction period may follow the program period.

In an embodiment, the offset correction period may include a first offset correction period OC1 and a second offset correction period OC2. The first offset correction period OC1 may correspond to the first comparison period COM1 and precede the first comparison period COM1, and the second offset correction period OC2 may correspond to the second comparison period COM2 and precede the second comparison period COM2. For example, the first offset correction period OC1 may be from a third time t3 to a fourth time t4, the first comparison period COM1 may be from the fourth time t4 to a fifth time t5, the second offset correction period OC2 may be from the fifth time t5 to a sixth time t6, and the second comparison period COM2 may be from the sixth time t6 to a seventh time t7. Hereinafter, the offset correction period may refer to at least one of the first offset correction period OC1 and the second offset correction period OC2.

The display driving circuit 100 may include a compensation capacitor CSp for stabilizing the source amplifier SA when the source amplifier SA amplifies the pixel voltage. In the first operation mode, the compensation capacitor CSp may stabilize the source amplifier SA. The compensation capacitor CSp may be connected between the first input terminal of the source amplifier SA and the second switching element sw2.

In an embodiment, in the second operation mode, the compensation capacitor CSp may store the offset of the source amplifier SA. In the offset correction period, the compensation capacitor CSp may store the offset of the source amplifier SA.

The display driving circuit 100 may include a fifth switching element sw5. The fifth switching element sw5 may be connected between the compensation capacitor CSp and the initialization power supply EVINT. The control logic may control the fifth switching element sw5. The control logic may output a control signal Ssw5 for controlling the fifth switching element sw5. The fifth switching element sw5 may operate in response to the control signal Ssw5.

In an embodiment, the control logic may control the first switching element sw1 and the fifth switching element sw5 such that an offset voltage of the source amplifier SA is stored in the compensation capacitor CSp. In the offset correction period, the control signal Ssw1 may be of an active level. The first switching element sw1 may be turned on based on the control signal Ssw1 of the active level. Because the output terminal and the first input terminal of the source amplifier SA are connected through the first switching element sw1, a feedback loop may be formed. In the offset correction period, the control signal Ssw5 may be of an active level. The fifth switching element sw5 may be turned on based on the control signal Ssw5 of the active level. The fifth switching element sw5 may be turned on to store the offset voltage in the compensation capacitor CSp.

In the first offset correction period OC1, the control signal Ssw1 and the control signal Ssw5 may be of an active level. At the third time t3, the control signal Ssw5 may transition from the inactive level to the active level. In the second offset correction period OC2, the control signal Ssw1 and the control signal Ssw5 may be of an active level. At the fifth time t5, the control signal Ssw5 may transition from the inactive level to the active level. At the fifth time t5, the control signal Ssw1 may transition from the inactive level to the active level.

In the first offset correction period OC1 and the second offset correction period OC2, the test switching element swt may be turned on in response to the control signal Sswt of the active level and the MUX switching element swm may be turned off in response to the control signal Sswm of the inactive level. The fifth transistor T5 and the sixth transistor T6 may be turned off in response to the emission control signal EM of the active level. The second transistor T2 and the third transistor T3 may be turned on in response to the first scan signal s1 of the inactive level. The fourth transistor T4 may be turned on in response to the second scan signal s2 of the inactive level. The second switching element sw2 may be turned off in response to the control signal Ssw2 of the inactive level. The third switching element sw3 may be turned off in response to the control signal Ssw3 of the inactive level. The level switching element sw1 may be turned off in response to the control signal Ssw1 of the inactive level.

In the offset correction period, test data may be provided. In the first offset correction period OC1, the decoder DEC may receive the first test data DTC1. The first comparison voltage Vref1 of a level corresponding to the first test data DTC1 may be provided to the source amplifier SA. In the first offset correction period OC1, the first test data DTC1 may be provided to the decoder DEC and the first comparison voltage Vref1 may be output as the decoder voltage Vd. The first comparison voltage Vref1 may be provided to the second input terminal of the source amplifier SA.

In the second offset correction period OC2, the decoder DEC may receive the second test data DTC2. The second comparison voltage Vref2 of a level corresponding to the second test data DTC2 may be provided to the source amplifier SA. In the second offset correction period OC2, the second test data DTC2 may be provided to the decoder DEC and the second comparison voltage Vref2 may be output as the decoder voltage Vd. The second comparison voltage Vref2 may be provided to the second input terminal of the source amplifier SA.

FIG. 10B is a diagram for describing a comparison period after an offset correction period according to an embodiment. Redundant descriptions with those given above will be omitted for conciseness.

Referring to FIGS. 10B and 11, in the comparison period, the pixel PXb and the display driving circuit 100 may operate similarly to those described above with reference to FIGS. 6A to 9. The first comparison period COM1 may be performed after the first offset correction period OC1. In the first comparison period COM1, the offset of the source amplifier SA stored in the first offset correction period OC1 may be removed. The second comparison period COM2 may be performed after the second offset correction period OC2. In the second comparison period COM2, the offset of the source amplifier SA stored in the second offset correction period OC2 may be removed.

In an embodiment, in the first comparison period COM1, the first switching element sw1 and the second switching element sw2 may be controlled. In the first comparison period COM1, the control signal Ssw1 may be of an inactive level. At the fourth time t4, the control signal Ssw1 may transition from the active level to the inactive level. In the first comparison period COM1, the first switching element sw1 may be turned off based on the control signal Ssw1 of the inactive level. In the first comparison period COM1, the control signal Ssw2 may be of an active level. At the fourth time t4, the control signal Ssw2 may transition from the inactive level to the active level. In the first comparison period COM1, the second switching element sw2 may be turned on based on the control signal Ssw2 of the active level. The sample voltage Vs may be provided to the compensation capacitor CSp.

In the first comparison period COM1, the control signal Ssw5 may be of an inactive level. At the fourth time t4, the control signal Ssw5 may transition from the active level to the inactive level. In the first comparison period COM1, the fifth switching element sw5 may be turned off based on the control signal Ssw5 of the inactive level. In the first comparison period COM1, because the offset voltage of the source amplifier SA stored in the compensation capacitor CSp is added to the sample voltage Vs, even when there is an offset voltage of the source amplifier SA, the first comparison data obtained by removing the offset voltage of the source amplifier SA may be output.

In an embodiment, in the second comparison period COM2, the first switching element sw1 and the second switching element sw2 may be controlled. In the second comparison period COM2, the control signal Ssw1 may be of an inactive level. At the sixth time t6, the control signal Ssw1 may transition from the active level to the inactive level. In the second comparison period COM2, the first switching element sw1 may be turned off based on the control signal Ssw1 of the inactive level. In the second comparison period COM2, the control signal Ssw2 may be of an active level. At the sixth time t6, the control signal Ssw2 may transition from the inactive level to the active level. In the second comparison period COM2, the second switching element sw2 may be turned on based on the control signal Ssw2 of the active level. The sample voltage Vs may be provided to the compensation capacitor CSp.

In the second comparison period COM2, the control signal Ssw5 may be of an inactive level. At the sixth time t6, the control signal Ssw5 may transition from the active level to the inactive level. In the second comparison period COM2, the fifth switching element sw5 may be turned off based on the control signal Ssw5 of the inactive level. In the second comparison period COM2, because the offset voltage of the source amplifier SA stored in the compensation capacitor CSp is added to the sample voltage Vs, even when there is an offset voltage of the source amplifier SA, the second comparison data obtained by removing the offset voltage of the source amplifier SA may be output.

Figure 12A:
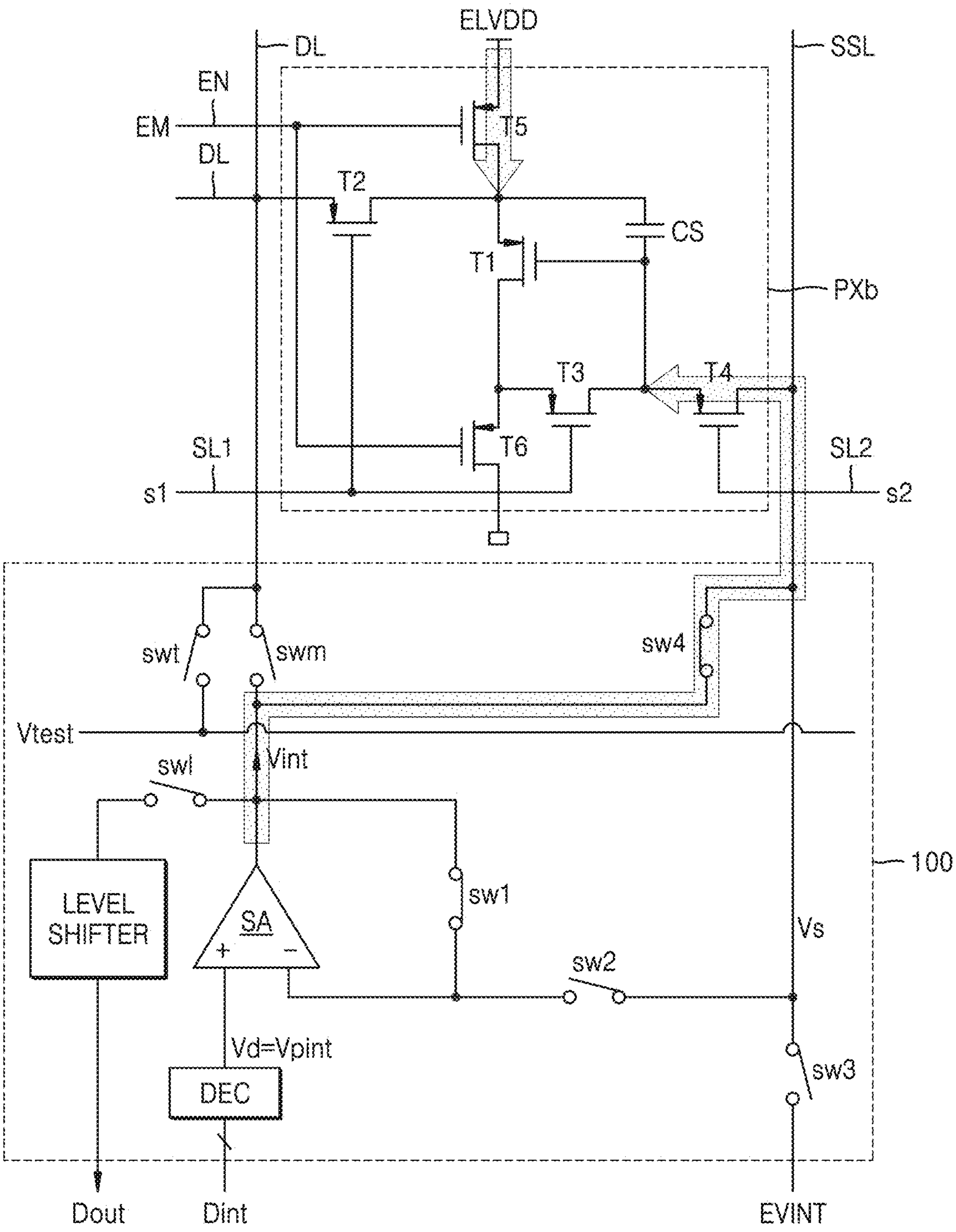
FIG. 12A is a diagram for describing an emission reset period according to an embodiment.
Figure 12B:
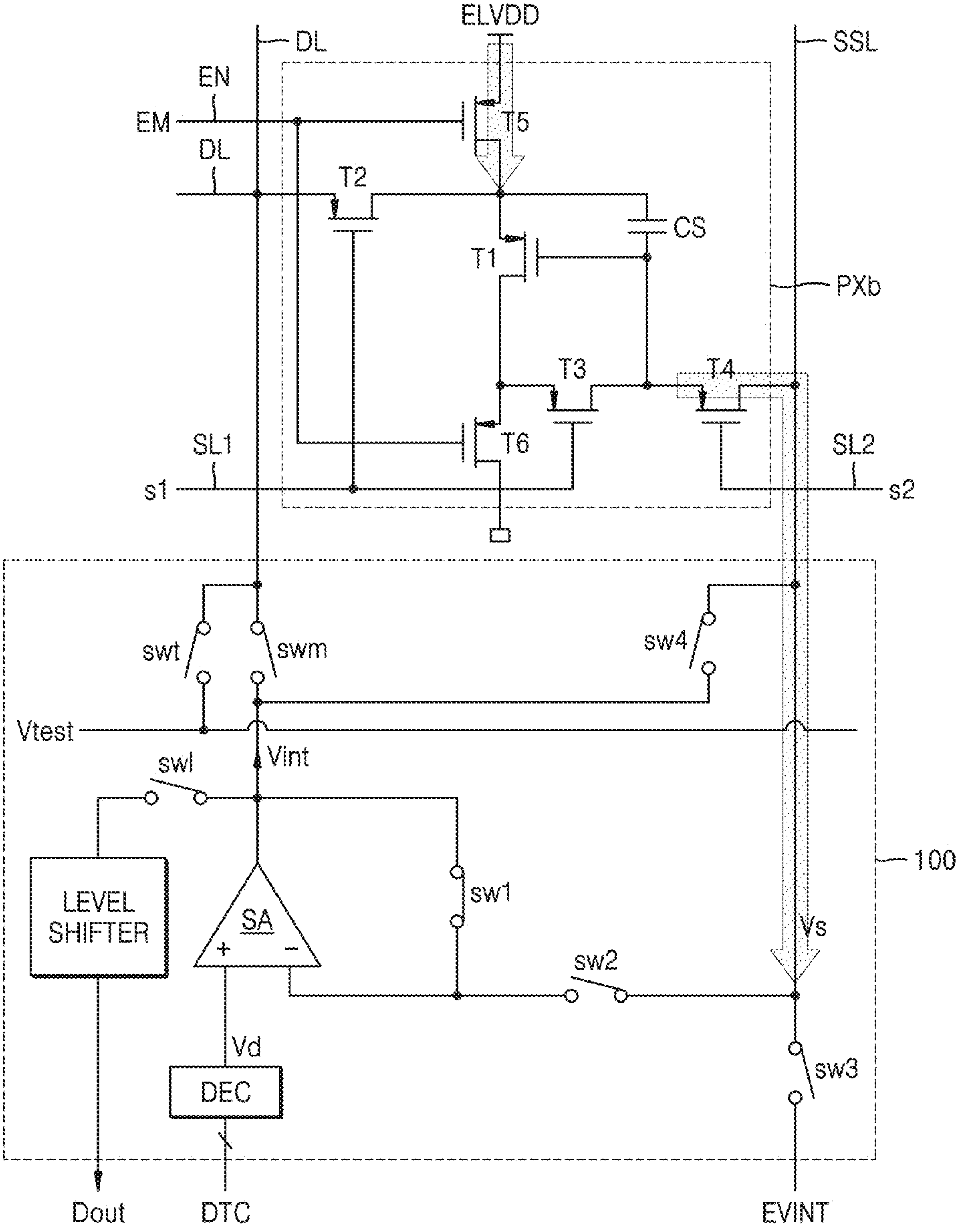
FIG. 12B is a diagram for describing an emission program period according to an embodiment.
Figure 12C:
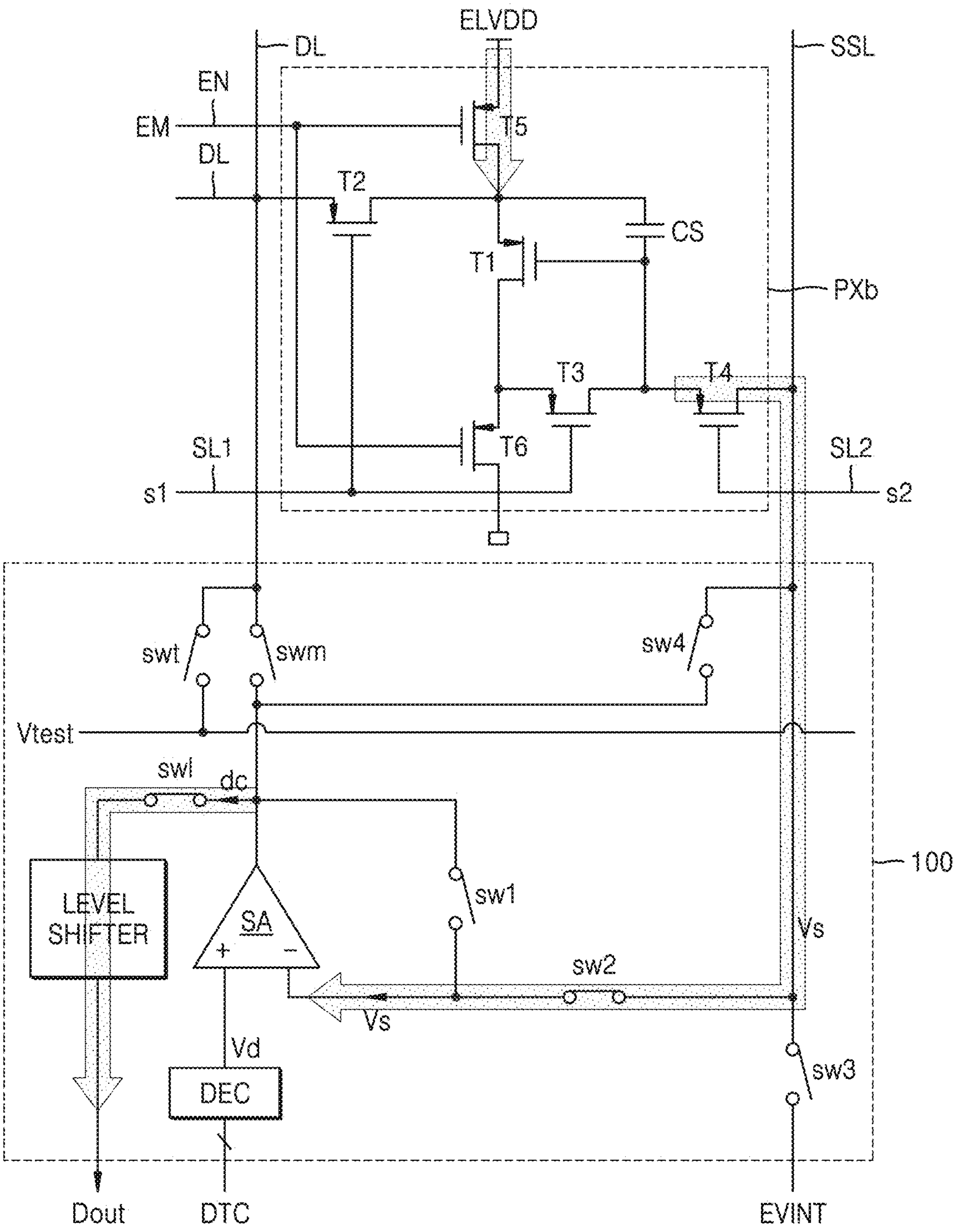
FIG. 12C is a diagram for describing an emission comparison period according to an embodiment.
Figure 13:
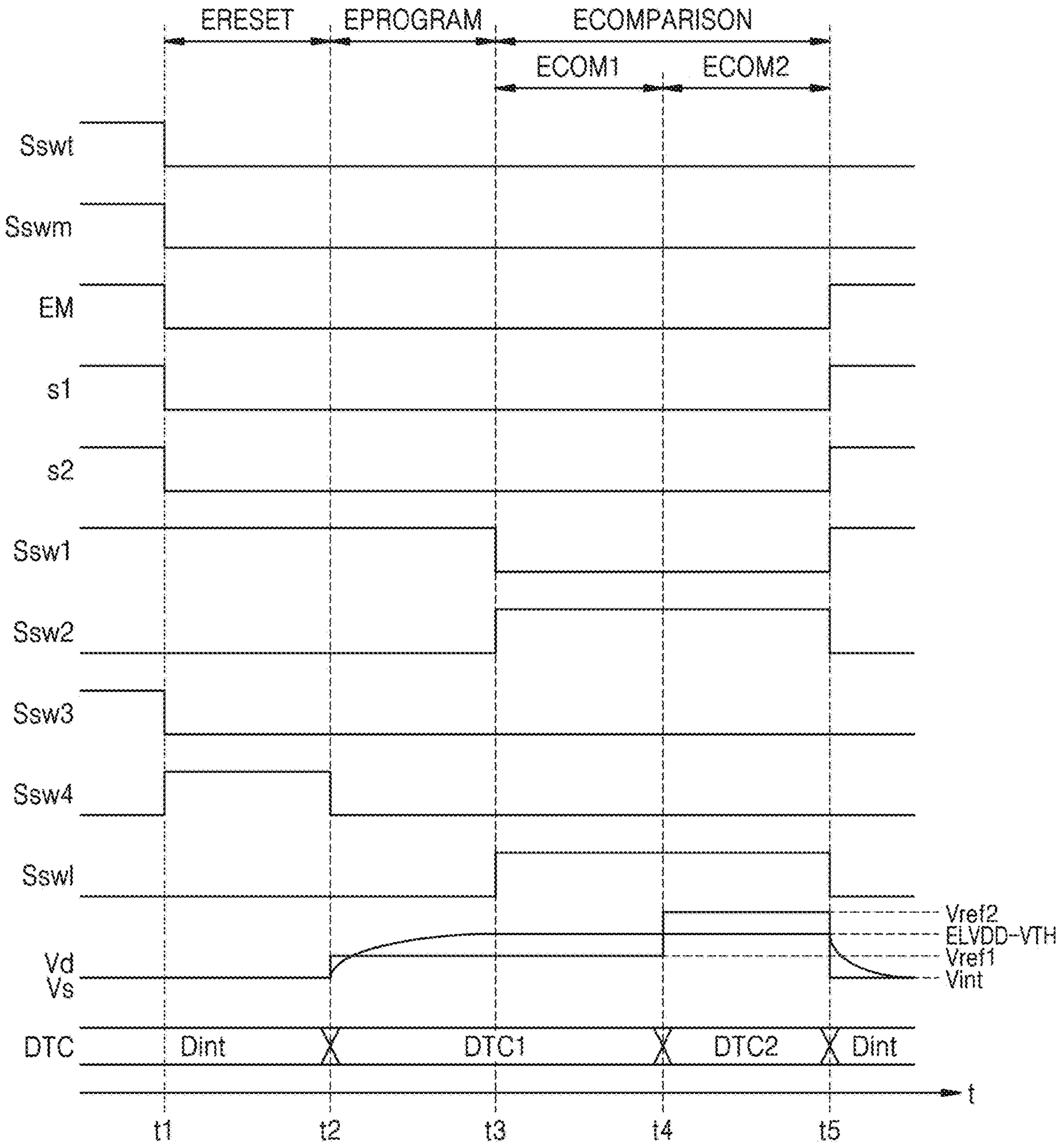
FIG. 13 is a timing diagram illustrating a plurality of signals for controlling a pixel and a display driving circuit, according to an embodiment.

FIG. 12A is a diagram for describing an emission reset period according to an embodiment. FIG. 12B is a diagram for describing an emission program period according to an embodiment. FIG. 12C is a diagram for describing an emission comparison period according to an embodiment. FIG. 13 is a timing diagram illustrating a plurality of signals for controlling a pixel and a display driving circuit, according to an embodiment. Redundant descriptions with those given above will be omitted for conciseness.

Referring to FIGS. 12A and 12B, the pixel PXb may include the fifth transistor T5. The fifth transistor T5 may operate in response to the emission control signal EM. A gate electrode of the fifth transistor T5 may be connected to the emission control line EN, a source electrode of the fifth transistor T5 may be connected to the first driving power supply ELVDD, and a drain electrode of the fifth transistor T5 may be connected to the first transistor T1. The fifth transistor T5 may also be referred to as an emission switching element. FIGS. 12A to 12C illustrate that the pixel PXb includes six transistors. However, embodiments are not limited thereto and, in some embodiments, the pixel PXb may include various numbers of transistors and the description of FIGS. 12A to 12C may be applied to pixels PXb with various structures.

FIGS. 12A to 12C and 13 illustrate an embodiment of determining whether an error has occurred in the emission switching element. In the second operation mode, an error in the pixel PXb may be determined and an error in the emission switching element may be determined. The second operation mode may include at least one of a reset period, a program period, a comparison period, and an offset correction period for determining an error in the pixel PXb. The second operation mode may include at least one of an emission reset period, an emission program period, and an emission comparison period for determining an error in the emission switching element. In the second operation mode, an error in the emission switching element may be determined after an error in the pixel PXb is determined. However, embodiments are not limited thereto and, in some embodiments, an error in the pixel PXb may be determined after an error in the emission switching element is determined.

Referring to FIGS. 12A and 13, the second operation mode may include an emission reset period ERESET. The emission reset period ERESET may be from a first time t1 to a second time t2. The emission reset period ERESET may refer to a period in which the emission switching element is initialized. In the emission reset period ERESET, a first driving voltage for determining an error in the fifth transistor T5 may be applied to the fifth transistor T5. The test voltage Vtest may not be applied to the pixel PXb. The test voltage Vtest may not be applied to the pixel PXb through the data line DL.

In an embodiment, the control logic (e.g., the control logic 110 of FIG. 1) may not apply the test voltage Vtest to the pixel PXb through the data line DL. In the emission reset period ERESET, the control signal Sswt and the control signal Sswm may be of an inactive level. In the emission reset period ERESET, the test switching element swt may be turned off and the MUX switching element swm may be turned off such that the test voltage Vtest may not be applied to the data line DL.

In the emission reset period ERESET, the fifth transistor T5 may be turned on. The fifth transistor T5 may operate in response to the emission control signal EM applied through the emission control line EN. In the emission reset period ERESET, the emission control signal EM may be of an inactive level. The fifth transistor T5 may be turned on in response to the emission control signal EM of the inactive level. The fifth transistor T5 may be turned on such that the first driving voltage may be applied to the pixel PXb from the first driving power supply ELVDD.

In the emission reset period ERESET, the second transistor T2 may be turned on in response to the first scan signal s1 of the inactive level and the third transistor T2 may be turned on in response to the first scan signal s1 of the inactive level. In the emission reset period ERESET, the sixth transistor T6 may be turned on in response to the emission control signal EM of the inactive level.

In the emission reset period ERESET, the initialization voltage Vint may be applied to the pixel PXb. The display driving circuit 100 may include a fourth switching element sw4 connected between the output terminal of the source amplifier SA and the sensing line SSL. The control logic may control the fourth switching element sw4. The control logic may output a control signal Ssw4 for controlling the fourth switching element sw4. The fourth switching element sw4 may operate in response to the control signal Ssw4.

In the emission reset period ERESET, the control signal Ssw1 may be of an active level and the control signal Ssw2 may be of an inactive level. The first switching element sw1 may be turned on based on the control signal Ssw1 of the active level, and the second switching element sw2 may be turned off based on the control signal Ssw2 of the inactive level.

In the emission reset period ERESET, the fourth switching element sw4 may be turned on based on the control signal Ssw4 of the active level. The control logic may turn on the first switching element sw1 and the fourth switching element sw4 to apply the initialization voltage Vint to the pixel PXb through the fourth switching element sw4 from the output terminal of the source amplifier SA. The control logic may turn off the second switching element sw2 not to connect the first input terminal of the source amplifier SA to the sensing line SSL.

In the emission reset period ERESET, in response to the second scan signal s2 of the inactive level, the fourth transistor T4 may be turned on and the fourth transistor T4 may transmit the initialization voltage Vint provided from the source amplifier SA, to the first node n1. The third switching element sw3 may be turned off based on the control signal Ssw3 of the inactive level. The level switching element sw1 may be turned off based on the control signal Ssw1 of the inactive level.

In the emission reset period ERESET, the decoder DEC may receive the initialization data Dint. In the emission reset period ERESET, the initialization data Dint may be provided to the decoder DEC and the decoder voltage Vd may be output. The output voltage Vd corresponding to the initialization data Dint may be a preliminary initialization voltage Vpint, and the preliminary initialization voltage Vpint may be provided to the second input terminal of the source amplifier SA. The source amplifier SA may amplify the preliminary initialization voltage Vpint and output the initialization voltage Vint.

FIG. 12B is a diagram for describing an emission program period according to an embodiment. Redundant descriptions with those given above with reference to FIG. 12A will be omitted for conciseness.

Referring to FIGS. 12B and 13, the second operation mode may include an emission program period EPROGRAM. The emission program period EPROGRAM may be from the second time t2 to a third time t3. In the emission program period EPROGRAM, because the control signal Sswt and the control signal Sswm are of an inactive level, the test switching element swt and the MUX switching element swm may maintain the turn-off state.

In the emission program period EPROGRAM, because the first scan signal s1 is of an inactive level, the second transistor T2 and the third transistor T3 may maintain the turn-on state. In the emission program period EPROGRAM, because the emission control signal EM is of an inactive level, the fifth transistor T5 and the sixth transistor T6 may maintain the turn-on state. In the emission program period EPROGRAM, the control signal Ssw1 may be of an active level and the control signal Ssw2 may be of an inactive level. The first switching element sw1 may be in a turn-on state, and the second switching element sw2 may be in a turn-off state.

In the emission program period EPROGRAM, the control signal Ssw4 may be of an inactive level. At the second time t2, the control signal Ssw4 may transition from the active level to the inactive level. The fourth switching element sw4 may be turned on based off the control signal Ssw4 of the inactive level. In the emission program period EPROGRAM, the control logic may turn off the fourth switching element sw4 such that the sample voltage Vs of the pixel PXb may be output through the sensing line SSL.

In the emission program period EPROGRAM, because the second scan signal s2 is of an inactive level, the fourth transistor T4 may maintain the turn-on state. The fourth transistor T4 may provide the voltage of the first node n1 as the sample voltage Vs through the sensing line SSL. For example, the sample voltage Vs may be the difference between the first driving voltage ELVDD and the threshold voltage VTH of the first transistor T1. In the emission program period EPROGRAM, the level switching element sw1 may maintain the turn-off state based on the control signal Ssw1 of the inactive level.

FIG. 12C is a diagram for describing an emission comparison period according to an embodiment. Redundant descriptions with those given above will be omitted for conciseness.

Referring to FIGS. 12C and 13, the second operation mode may include an emission comparison period ECOMPARISON. The emission comparison period ECOMPARISON may be from the third time t3 to a fifth time t5. The emission comparison period ECOMPARISON may include a first emission comparison period ECOM1 and a second emission comparison period ECOM2. The first emission comparison period ECOM1 and the second emission comparison period ECOM2 may operate similarly to the pixel PXb and the display driving circuit 100 in the first comparison period and the second comparison period described above, respectively.

In the first emission comparison period ECOM1, the source amplifier SA may output first emission comparison data by comparing the sample voltage Vs with the first comparison voltage Vref1. In the second emission comparison period ECOM2, the source amplifier SA may output second emission comparison data by comparing the sample voltage Vs with the second comparison voltage Vref2. In the first emission comparison period ECOM1, the first emission comparison data may be provided to the level shifter and first emission output data may be output. In the second emission comparison period ECOM2, the second emission comparison data may be provided to the level shifter and second emission output data may be output.

In an embodiment, the display driving circuit 100 may determine whether an error has occurred in at least a portion of the pixel PXb including the emission switching element. In other words, the display driving circuit 100 may determine whether an error has occurred in the fifth transistor T5. The control logic may determine, based on the first emission comparison data and the second emission comparison data, whether an error has occurred in the fifth transistor T5. Particularly, the control logic may receive the first emission output data and the second emission output data and determine, based on the first emission output data and the second emission output data, whether an error has occurred in the fifth transistor T5. In some embodiments, the control logic may be configured to output an error signal indicating whether an error has occurred in the fifth transistor T5. For example, in some embodiments, the error signal may be a flag. In some embodiments, an action may be taken to correct the transistor T5 in which an error has occurred based on the error signal. For example, the display panel 200 may be routed during manufacturing for a corrective action to fix or replace the fifth transistor T5 of the pixel PXb. However, embodiments are not limited to the control logic determining whether the error has occurred. However, embodiments are not limited thereto and, in some embodiments, the test equipment outside the display device may receive the first emission output data and the second emission output data and may determine, based on the first emission output data and the second emission output data, whether an error has occurred in a portion of the pixel PXb including the fifth transistor T5. Because it is determined whether an error has occurred in at least a portion of the pixel PXb including the emission switching element, whether an error has occurred in the pixel PXb may be accurately determined in detail.

Figure 14:
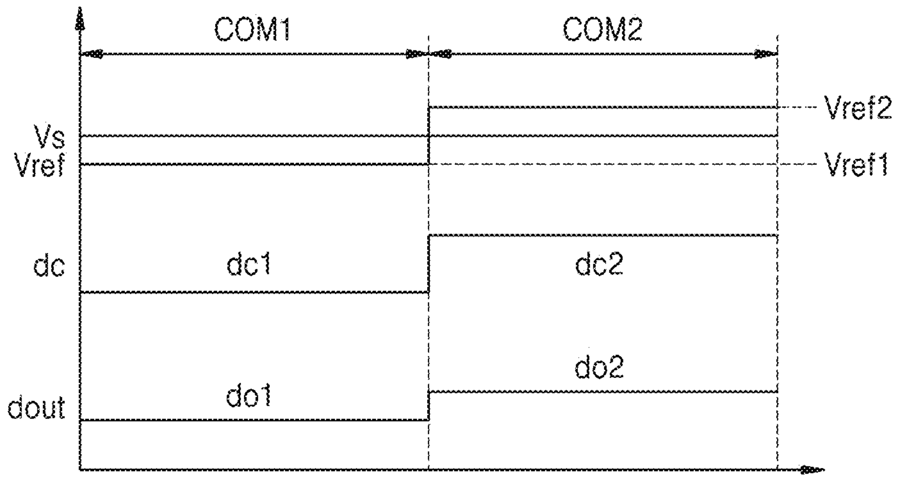
FIG. 14 is a diagram for describing a method by which a display driving circuit determines whether an error has occurred in a pixel, according to an embodiment.

FIG. 14 is a diagram for describing a method by which a display driving circuit determines whether an error has occurred in a pixel, according to an embodiment. FIG. 14 illustrates a case where no error has occurred in a pixel. FIG.

14 illustrates a method of determining, based on comparison data output in a comparison period, whether an error has occurred in a pixel. However, the description of FIG. 14 may also be similarly applied to a method of determining, based on emission comparison data output in an emission comparison period, whether an error has occurred in a portion of a pixel including an emission switching element.

In an embodiment, based on the comparison data dc, the control logic (e.g., the control logic 110 of FIG. 1) may determine whether an error has occurred in each of the pixels PX. First comparison data dc1 may be output in the first comparison period COM1, and second comparison data dc2 may be output in the second comparison period COM2.

The source amplifier may output the first comparison data dc1 and the second comparison data dc2. In the first comparison period COM1, the source amplifier may receive the first comparison voltage Vref1 and the sample voltage Vs. The first comparison voltage Vref1 may be input to the second input terminal of the source amplifier, and the sample voltage Vs may be input to the first input terminal of the source amplifier.

In the first comparison period COM1, the source amplifier (e.g., the source amplifier SA of FIG. 2) may compare the first comparison voltage Vref1 with the sample voltage Vs and generate the first comparison data dc1. When the first comparison voltage Vref1 is lower than the sample voltage Vs, the source amplifier may output the first comparison data dc1 of an inactive level (e.g., low level or first level).

In the second comparison period COM2, the source amplifier may receive the second comparison voltage Vref2 and the sample voltage Vs. The second comparison voltage Vref2 may be input to the second input terminal of the source amplifier, and the sample voltage Vs may be input to the first input terminal of the source amplifier.

In the second comparison period COM2, the source amplifier may compare the second comparison voltage Vref2 with the sample voltage Vs and generate the second comparison data dc2. When the second comparison voltage Vref2 is higher than the sample voltage Vs, the source amplifier may output the second comparison data dc2 of an active level (e.g., high level or second level).

The level shifter may generate first output data do1 by converting the level of the first comparison data dc1 and generate second output data do2 by converting the level of the second comparison data dc2. For example, the level shifter may generate the second output data do2 by lowering the level of the second comparison data dc2.

The control logic may determine, based on the first comparison data dc1 and the second comparison data dc2, whether an error has occurred in the pixel. The control logic may determine, based on the first output data do1 and the second output data do2, whether an error has occurred in the pixel. In an embodiment, when the logic level of the first output data do1 corresponds to a first logic level (e.g., logic low level, first level, or inactive level) and the logic level of the second output data do2 corresponds to a second logic level (logic high level, second level, or active level), the control logic may determine that no error has occurred in the pixel. When the sample voltage Vs is higher than the first comparison voltage Vref1 and lower than the second comparison voltage Vref2, the logic level of the first output data do1 may be the first logic level and the logic level of the second output data do2 may be the second logic level. Thus, when the logic level of the first output data do1 is the first logic level and the logic level of the second output data do2 is the second logic level, because the sample voltage Vs is between the first comparison voltage Vref1 and the second comparison voltage Vref2, the control logic may determine that no error has occurred in the pixel.

Figure 15A:
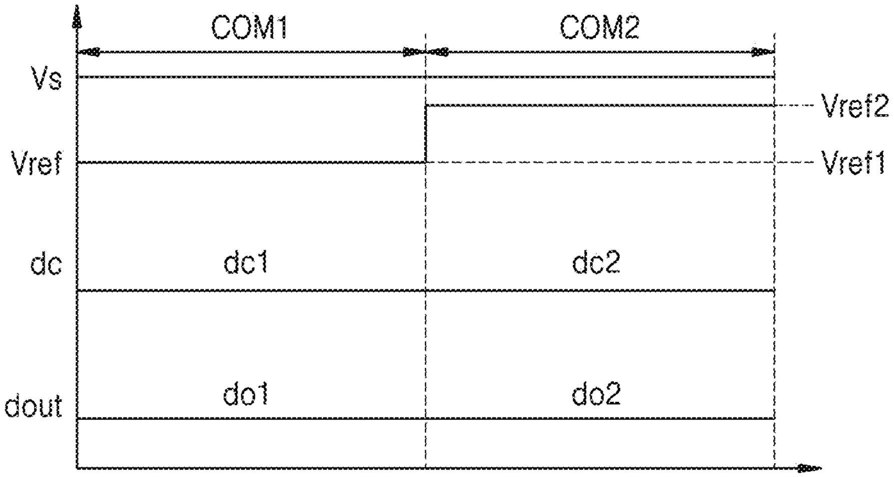
FIG. 15A is a diagram for describing a method by which a display driving circuit determines that an error has occurred in a pixel, according to an embodiment.

FIG. 15A is a diagram for describing a method by which a display driving circuit determines that an error has occurred in a pixel, according to an embodiment. FIG. 15A illustrates a case where an error has occurred in a pixel. Redundant descriptions with those given above with reference to FIG. 14 will be omitted for conciseness.

In the first comparison period COM1, when the first comparison voltage Vref1 is lower than the sample voltage Vs, the source amplifier may output the first comparison data dc1 of an inactive level (e.g., low level or first level).

In the second comparison period COM2, because the second comparison voltage Vref2 is lower than the sample voltage Vs, the source amplifier may output the second comparison data dc2 of an inactive level (e.g., low level or first level).

The level shifter may generate first output data do1 of an inactive level by converting the level of the first comparison data dc1 and generate second output data do2 of an inactive level by converting the level of the second comparison data dc2.

In an embodiment, when the logic level of the first output data do1 corresponds to the first logic level and the logic level of the second output data do2 corresponds to the second logic level, the control logic may determine that no error has occurred in the pixel (i.e., as described with reference to FIG. 14 above). Because the logic level of the first output data do1 corresponds to the first logic level but the logic level of the second output data do2 corresponds to the first logic level, the control logic may determine that an error has occurred in the pixel.

When the logic level of the first output data do1 and the second output data do2 is the first logic level, because the sample voltage Vs is higher than the second comparison voltage Vref2, the control logic may determine that an error has occurred in the pixel.

Figure 15B:
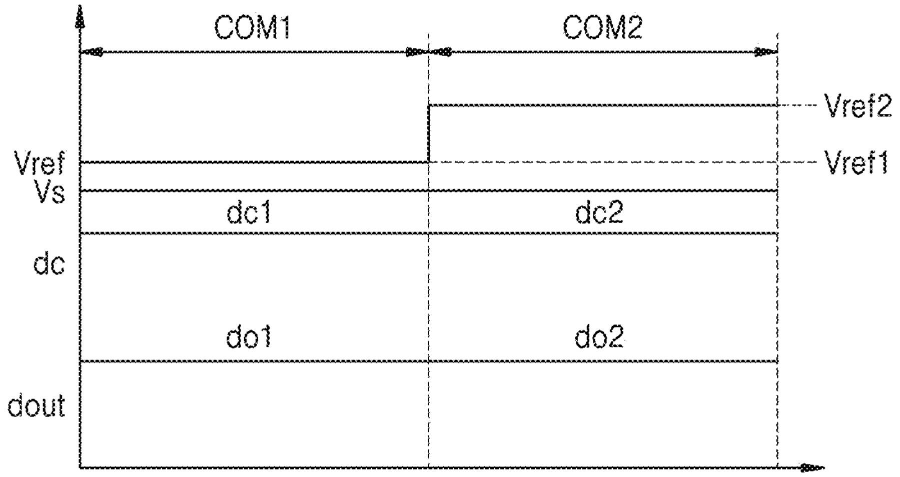
FIG. 15B is a diagram for describing a method by which a display driving circuit determines that an error has occurred in a pixel, according to an embodiment.

FIG. 15B is a diagram for describing a method by which a display driving circuit determines that an error has occurred in a pixel, according to an embodiment. Compared to FIG. 15A, FIG. 15B illustrates a case where the first comparison data dc1 and the second comparison data dc2 are of an active level. Redundant descriptions with those given above will be omitted for conciseness.

In the first comparison period COM1, because the first comparison voltage Vref1 is higher than the sample voltage Vs, the source amplifier may output the first comparison data dc1 of an active level.

In the second comparison period COM2, because the second comparison voltage Vref2 is higher than the sample voltage Vs, the source amplifier may output the second comparison data dc2 of an active level.

The level shifter may generate first output data do1 of an active level by converting the level of the first comparison data dc1 and generate second output data do2 of an active level by converting the level of the second comparison data dc2.

In an embodiment, when the logic level of the first output data do1 corresponds to the first logic level and the logic level of the second output data do2 corresponds to the second logic level, the control logic may determine that no error has occurred in the pixel (i.e., as illustrated with respect to FIG. 14 above). Because the logic level of the second output data do2 corresponds to the second logic level but the logic level of the first output data do1 corresponds to the second logic level, the control logic may determine that an error has occurred in the pixel.

When each of the logic level of the first output data do1 and the second output data do2 is the second logic level, because the sample voltage Vs is lower than the first comparison voltage Vref1, the control logic may determine that an error has occurred in the pixel.

Figure 16:
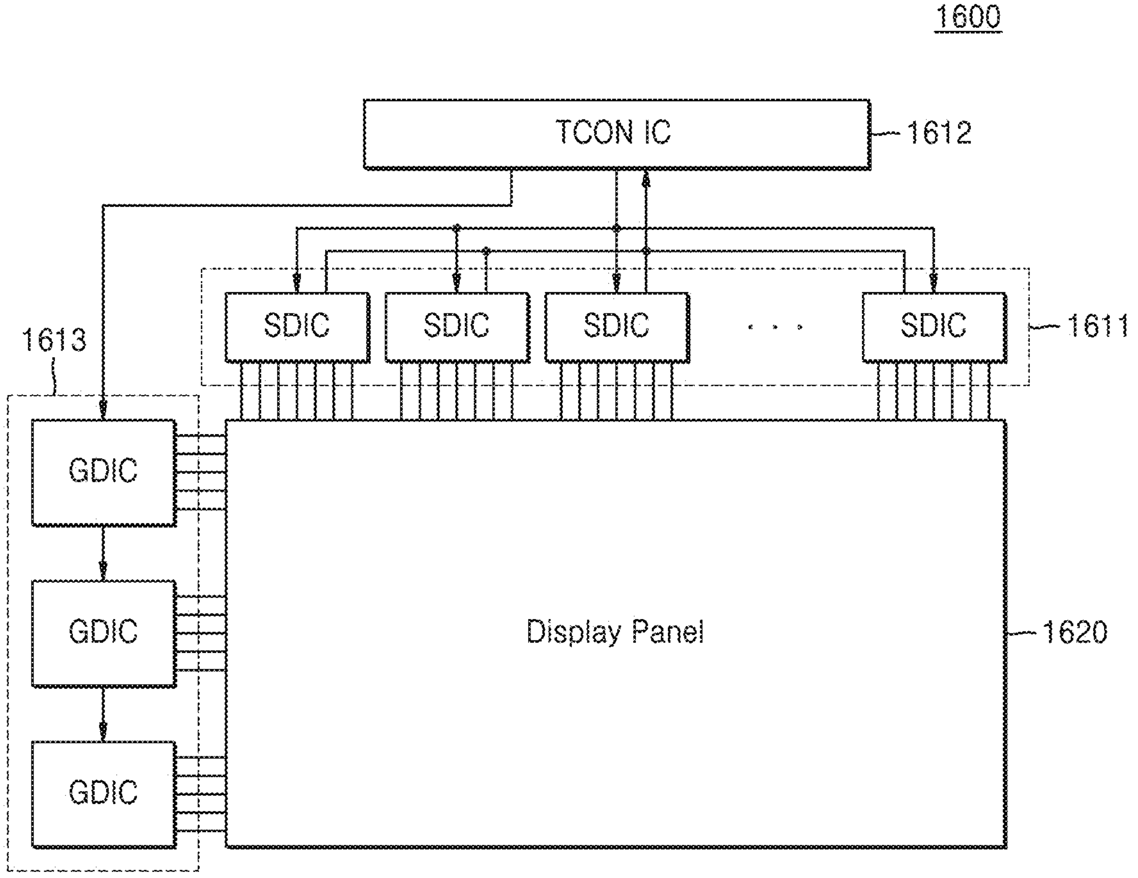
FIG. 16 is a diagram illustrating a display device according to an embodiment.

FIG. 16 is a diagram illustrating a display device according to an embodiment. A display device 1600 of FIG. 16 may be a device including a medium-to-large display panel 1620 and may be applied to, for example, a television, a monitor, and the like.

Referring to FIG. 16, the display device 1600 may include a source driver 1611, a timing controller (TCON IC) 1612, a gate driver 1613, and a display panel 1620.

The timing controller (TCON IC) 1612 may include one or more ICs or modules. The timing controller 1612 may communicate with a plurality of source driver ICs SDIC and a plurality of gate driver ICs GDIC through a set interface.

The timing controller (TCON IC) 1612 may generate control signals for controlling the driving timing of the plurality of source driver ICs SDIC and the plurality of gate driver ICs GDIC and provide the control signals to the plurality of source driver ICs SDIC and the plurality of gate driver ICs GDIC.

The source driver 1611 may include a plurality of source driver ICs SDIC, and the plurality of source driver ICs SDIC may be mounted on a circuit film such as TCP, COF, or FPC and may be attached to the display panel 1620 by a TAB method or may be mounted on a non-display area of the display panel 1620 by a COG method.

The gate driver 1613 may include a plurality of gate driver ICs GDIC, and the plurality of gate driver ICs GDIC may be mounted on a circuit film and may be attached to the display panel 1620 by the TAB method or may be mounted on the non-display area of the display panel 1620 by the COG method. Alternatively, the gate driver 1613 may be directly formed on a lower substrate of the display panel 1620 by a gate driver in panel (GIP) method. The gate driver 1413 may be formed in the non-display area outside the pixel array where pixels are formed in the display panel 1620 and may be formed by the same TFT process as the pixels.

As described above with reference to FIGS. 1 to 15B, the display device 1600 may include a first switching element and a second switching element and control the first switching element and the second switching element such that a source amplifier outputs comparison data by comparing a sample voltage input to a first input terminal through a sensing line with a comparison voltage input to a second input terminal. Accordingly, the source amplifier may operate as a comparator to compare the sample voltage with the comparison voltage, thereby reducing the cost required to determine whether an error has occurred in the pixel.

While various embodiments have been particularly shown and described with reference to the drawings, it will be understood that various changes in form and details may be made therein without departing from the spirit and scope of the following claims.

What is claimed is:

1. A display driving circuit for driving a display panel including a data line, a sensing line, and a pixel connected to the data line and the sensing line, the display driving circuit comprising:
- a control logic controlling an operation of the display driving circuit;
- a source amplifier comprising a first input terminal, a second input terminal, and an output terminal, the source amplifier amplifying a pixel voltage for displaying an image on the display panel and providing the amplified pixel voltage to the pixel through the data line;
- a first switching element connected between the first input terminal and the output terminal; and
- a second switching element connected between the first input terminal and the sensing line,
- wherein the control logic performs a first control to control the first switching element and the second switching element such that the source amplifier amplifies the pixel voltage, and performs a second control to control the first switching element and the second switching element such that the source amplifier compares a sample voltage that is input to the first input terminal through the sensing line with a comparison voltage input to the second input terminal and outputs comparison data based on a comparison result of the sample voltage with the comparison voltage.

2. The display driving circuit of claim 1, further comprising a third switching element connected between an initialization power supply and the sensing line,
- wherein in the second control, the control logic, in a reset period, turns on the first switching element and the third switching element and turns off the second switching element to apply an initialization voltage from the initialization power supply to the pixel through the third switching element and the sensing line.

3. The display driving circuit of claim 2, wherein in the second control the control logic, in the reset period applies a test voltage to the pixel through the data line.

4. The display driving circuit of claim 3, wherein in the second control the control logic, in a program period after the reset period, turns off the third switching element such that the sample voltage is output through the sensing line.

5. The display driving circuit of claim 4, wherein in the second control the control logic, in a comparison period after the program period, turns off the first switching element and turns on the second switching element such that the source amplifier compares the sample voltage input to the first input terminal of the source amplifier with the comparison voltage input to the second input terminal, and outputs the comparison data.

6. The display driving circuit of claim 5, wherein the comparison period comprises a first comparison period and a second comparison period,
- the control logic, in the first comparison period, applies a first comparison voltage to the second input terminal of the source amplifier, and, in the second comparison period, applies a second comparison voltage to the second input terminal that is higher than the first comparison voltage, and
- the source amplifier, in the first comparison period, compares the sample voltage with the first comparison voltage and outputs first comparison data based on a comparison result of the sample voltage with the first comparison voltage, and,
- in the second comparison period, compares the sample voltage with the second comparison voltage and outputs second comparison data based on a comparison result of the sample voltage with the second comparison voltage.

7. The display driving circuit of claim 6, wherein the control logic, based on the first comparison data and the second comparison data, determines whether an error has occurred in the pixel.

8. The display driving circuit of claim 1, further comprising a fourth switching element connected between the sensing line and the output terminal, wherein in the second control, the control logic, in a reset period, turns on the first switching element and the fourth switching element to apply an initialization voltage from the output terminal of the source amplifier to the pixel through the fourth switching element.

9. The display driving circuit of claim 8, wherein in the second control, the control logic, in the reset period, applies a test voltage to the pixel through the data line.

10. The display driving circuit of claim 9, wherein in the second control, the control logic, in the reset period, applies a preliminary initialization voltage to the second input terminal of the source amplifier such that the initialization voltage is output from the output terminal of the source amplifier.

11. The display driving circuit of claim 9, wherein in the second control, the control logic, in a program period after the reset period, turns off the fourth switching element such that the sample voltage of the pixel is output through the sensing line.

12. The display driving circuit of claim 1, further comprising:

a compensation capacitor that stabilizes the source amplifier when the source amplifier amplifies the pixel voltage; and a fifth switching element connected between the compensation capacitor and an initialization power supply, wherein in the second control, the control logic, in an offset correction period, controls the first switching element and the fifth switching element such that an offset voltage of the source amplifier is stored in the compensation capacitor.

13. The display driving circuit of claim 12, wherein the control logic, in the offset correction period, turns on the first switching element to form a feedback loop connecting the first input terminal of the source amplifier to the output terminal of the source amplifier and turns on the fifth switching element to store the offset voltage in the compensation capacitor.

14. The display driving circuit of claim 1, wherein the pixel comprises an emission switching element connected to a driving power supply, and in the second control, the control logic applies a driving voltage from the driving power supply to the pixel through the emission switching element and applies an initialization voltage to the pixel.

15. The display driving circuit of claim 1, further comprising a level shifter that shifts a level of the comparison data.

16. A display driving circuit for driving a display panel including a plurality of data lines, a plurality of sensing lines, and a plurality of pixels connected to the plurality of data lines and the plurality of sensing lines, the display driving circuit comprising:

a plurality of decoders that correspond respectively to the plurality of data lines, each decoder converting pixel data of a corresponding data line and outputting a pixel voltage;

a plurality of source amplifiers that correspond respectively to the plurality of decoders, each source amplifier comprising a first input terminal, a second input terminal and an output terminal, and amplifying a corresponding pixel voltage and providing the amplified pixel voltage to a corresponding pixel through the corresponding data line;

a plurality of first switching elements that correspond respectively to the plurality of source amplifiers, each first switching element connected between the first input terminal and the output terminal of a corresponding source amplifier; and a plurality of second switching elements that corresponding respectively to the plurality of source amplifiers, each second switching element connected between the first input terminal of the corresponding source amplifier and a corresponding sensing line, wherein each of the plurality of source amplifiers, in a first operation mode, based on a first operation of a corresponding one of the plurality of first switching elements and a corresponding one of the plurality of second switching elements, amplifies the corresponding pixel voltage to be output to the corresponding data line, and, in a second operation mode, based on a second operation of the corresponding one of the plurality of first switching elements and the corresponding one of the plurality of second switching elements, compares a sample voltage input to the first input terminal through the corresponding sensing line with a comparison voltage input to the second input terminal and outputs comparison data.

17. The display driving circuit of claim 16, wherein, in the second operation mode, after each of the plurality of first switching elements is turned on and each of the plurality of second switching elements is turned off, each of the plurality of first switching elements is turned off and each of the plurality of second switching elements is turned on.

18. The display driving circuit of claim 16, wherein, in the first operation mode, the corresponding pixel voltage is applied to the corresponding data line, and in the second operation mode, a corresponding test voltage is applied to each data line.

19. The display driving circuit of claim 18, wherein each decoder outputs a first comparison voltage corresponding to first test data and a second comparison voltage corresponding to second test data, and in the second operation mode, each of the plurality of source amplifiers, when each of the plurality of first switching elements is turned off and each of the plurality of second switching elements is turned on, compares a corresponding sample voltage with the first comparison voltage and outputs first comparison data, and compares the corresponding sample voltage with the second comparison voltage and outputs second comparison data.

20. A display device comprising:

a display panel comprising a data line, a sensing line, and a pixel connected to the data line and the sensing line; and a display driving circuit that drives the display panel such that an image is displayed on the display panel, wherein the display driving circuit comprises:

a source amplifier comprising a first input terminal, a second input terminal, and an output terminal, the source amplifier amplifying a pixel voltage for displaying the image on the display panel and providing the amplified pixel voltage to the pixel through the data line;

a first switching element connected between the first input terminal and the output terminal of the source amplifier; and a second switching element connected between the first input terminal of the source amplifier and the sensing line, wherein the source amplifier, based on a first operation of the first switching element and the second switching element, amplifies the pixel voltage, and the source amplifier, based on a second operation of the first switching element and the second switching element, compares a sample voltage input to the first input terminal of the source amplifier through the sensing line with a comparison voltage input to the second input terminal of the source amplifier and outputs comparison data.

* * * * *